United States Patent
Lu et al.

(10) Patent No.: US 11,930,118 B2
(45) Date of Patent: Mar. 12, 2024

(54) AUTHENTICATION METHOD AND AUTHENTICATION DEVICE

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 625 days.

(21) Appl. No.: 17/159,051

(22) Filed: Jan. 26, 2021

(65) Prior Publication Data

US 2021/0152361 A1 May 20, 2021

Related U.S. Application Data

(63) Continuation of application No. PCT/CN2019/097383, filed on Jul. 24, 2019.

(30) Foreign Application Priority Data

Aug. 1, 2018 (CN) .......................... 201810866705.X

(51) Int. Cl.
*H04L 9/32* (2006.01)
*G06F 21/32* (2013.01)
(Continued)

(52) U.S. Cl.
CPC ............ *H04L 9/3231* (2013.01); *G06F 21/32* (2013.01); *G06F 21/45* (2013.01); *H04L 9/0869* (2013.01)

(58) Field of Classification Search
None
See application file for complete search history.

(56) References Cited

U.S. PATENT DOCUMENTS

| 2006/0075259 A1* | 4/2006 | Bajikar ............... G06F 12/1408 713/189 |
| 2013/0333015 A1 | 12/2013 | Reynolds |
| 2017/0180137 A1 | 6/2017 | Spanier |

FOREIGN PATENT DOCUMENTS

| CN | 101599836 A | 12/2009 |
| CN | 103095460 A | 5/2013 |

(Continued)

OTHER PUBLICATIONS

International Search Report of PCT/CN2019/097383.

*Primary Examiner* — Syed A Roni
(74) *Attorney, Agent, or Firm* — J.C. PATENTS

(57) ABSTRACT

An authentication method includes: receiving a command of an upper host; parsing an option parameter in the command; determining a value of a fingerprint authentication identifier in the option parameter, and if the value is a first preset value, prompting a user to input a fingerprint and verifying the fingerprint input to obtain a user operation verification result; if the value is a second preset value, prompting the user to press a key and verifying the key pressed to obtain a user operation verification result; determining the user operation verification result, and if the user operation verification result is success, setting an authentication mode confirmation identifier, obtaining client data from the command, generating data to be signed, signing the data to be signed to generate a signature result, sending the signature result to the upper host; if the user operation verification result is failure, reporting an error.

20 Claims, 11 Drawing Sheets

(51) Int. Cl.
    *G06F 21/45*     (2013.01)
    *H04L 9/08*     (2006.01)

(56) References Cited

FOREIGN PATENT DOCUMENTS

| | | |
|---|---|---|
| CN | 104901937 A | 9/2015 |
| CN | 106549973 A | 3/2017 |
| CN | 107612940 A | 1/2018 |
| CN | 108123957 A | 6/2018 |
| CN | 109086588 A | 12/2018 |

* cited by examiner

AUTHENTICATION METHOD AND AUTHENTICATION DEVICE

CROSS-REFERENCE TO RELATED APPLICATIONS

This application is a continuation of International Application No. PCT/CN2019/097383, filed on Jul. 24, 2019, which claims priority to Chinese Patent Application No. 201810866705.X, filed on Aug. 1, 2018, both of which are hereby incorporated by reference in their entireties.

TECHNICAL FIELD

The present disclosure relates to information security field, and in particular to an authentication method and an authentication device.

BACKGROUND

As an important part of an authentication device, a security environment (SE) chip is widely used in a computing and communicating system so as to improve safety of the whole system. In the prior art, an existing authentication device usually does not support multiple kinds of authenticating modes due to a hardware isolation characteristic of the security environment chip itself.

SUMMARY

In order to solve the technical problem above, the present disclosure provides an authentication method, which includes the following steps:

Step 101, receiving, by an authentication device, a command from an upper host;

Step 102, parsing, by the authentication device, an option parameter in the command of the upper host;

Step 103, determining, by the authentication device, a value of a fingerprint authentication identifier in the option parameter, and if the value of the fingerprint authentication identifier is a first preset value, executing Step 104; if the value of the fingerprint authentication identifier is a second preset value, executing Step 105;

Step 104, prompting, by the authentication device, a user to input a fingerprint and verifying the fingerprint input by the user to obtain a user operation verification result, executing Step 106;

Step 105, prompting, by the authentication device, the user to press a key and verifying the key pressed by the user to obtain a user operation verification result, executing Step 106;

Step 106, determining, by the authentication device, the user operation verification result, and if the user operation verification result is success, executing Step 107; if the user operation verification result is failure, reporting an error;

Step 107, setting, by the authentication device, an authentication mode confirmation identifier according to the value of the fingerprint authentication identifier, obtaining client data from the command of the upper host, generating data to be signed according to the authentication mode confirmation identifier and the client data, performing a signature operation on the data to be signed and generating a signature result;

Step 108, sending, by the authentication device, the signature result to the upper host.

In Step 103, when the authentication device determines that the value of the fingerprint authentication identifier in the option parameter is the first preset value, the method further includes: determining, by the authentication device, a value of an fingerprint entry status identifier in a command header of an instruction of the upper host, and if the value of the fingerprint entry status identifier is a third preset value, executing Step 104; if the value of the fingerprint entry status identifier is a fourth preset value, reporting an error;

In Step 101, the command of the upper host is specifically a credential-generating command.

In Step 101, the command of the upper host is assertion-obtaining command Assertion-obtaining command.

In Step 103, when the authentication device determines that the value of the fingerprint authentication identifier in the option parameter is the second preset value, the method further includes: determining, by the authenticating device, the value of the key authentication identifier in the option parameters, and if the value of the pressing key authenticating identifier is a first preset value, executing Step 105, and if the value of the key authentication identifier is the second preset value, executing Step 107;

when the authentication device determines in the Step 103 that the value of the fingerprint authentication identifier in the option parameter is the second preset value and the value of the key authentication identifier in the option parameter is the second preset value, Step 107 specifically is: setting, by the authentication device, the authentication mode confirmation identifier according to the value of the fingerprint authentication identifier and the value of the key authentication identifier, obtaining the client data from the command of the upper host, and generating the data to be signed according to the authentication mode confirmation identifier and the client data, performing the signature operation on the data to be signed and generating the signature result.

when the authenticating device determines in Step 103 that the value of the fingerprint authentication identifier in the option parameter is the first preset value, in Step 107 the setting, by the authentication device, the authentication mode confirmation identifier according to the value of the fingerprint authentication identifier is specifically: setting, by the authentication device, a bit corresponding to the fingerprint authentication identifier in the authentication mode confirmation identifier.

When the authenticating device determines in Step 103 that the value of the fingerprint authentication identifier in the option parameter is the second preset value, in Step 107 the setting, by the authentication device, the authentication mode confirmation identifier according to the value of the fingerprint authentication identifier is specifically: resetting, by the authentication device, a bit corresponding to the fingerprint authentication identifier in the authentication mode confirmation identifier.

When the value of the key authentication identifier is the first preset value, in Step 107, the setting, by the authentication device, the authentication mode confirmation identifier according to the value of the fingerprint authentication identifier and the value of the key authentication identifier specifically is: resetting, by the authentication device, the bit corresponding to the fingerprint authentication identifier in the authentication mode confirmation identifier, and setting the bit corresponding to the key authentication identifier in the authentication mode confirmation identifier;

When the value of the key authentication identifier is the second preset value, in Step 107, the setting, by the authentication device, the authentication mode confirmation identifier according to the value of the fingerprint authentication identifier and the value of the key authentication identifier specifically is: resetting, by the authentication device, the bit corresponding to the fingerprint authentication identifier in the authentication mode confirmation identifier, and resetting the bit corresponding to the key authentication identifier in the authentication mode confirmation identifier.

The authentication device includes a security environment chip and a fingerprint management chip, and in the method, Step 101 specifically is encapsulating, by the fingerprint management chip, the command received from the upper host into application protocol data unit instruction, and sending the application protocol data unit instruction to the security environment chip;

Step 102 specifically is receiving, by the security environment chip, the application protocol data unit instruction and parsing the option parameter in the application protocol data unit instruction;

Step 103 specifically is determining, by the security environment chip, the value of the fingerprint authentication identifier in the option parameter, and if the value of the fingerprint authentication identifier is the first preset value, executing Step 104, and if the value of the fingerprint authentication identifier is the second preset value, executing Step 105;

Step 104 specifically is prompting, by the fingerprint management chip, the user to input the fingerprint, verifying the fingerprint input by the user to obtain the user operation verification result and sending the user operation verification result to the security environment chip, executing Step 106;

Step 105 specifically is prompting, by the fingerprint management chip, the user to press the key, verifying the key pressed by the user to obtain the user operation verification result, sending the user operation verification result to the security environment chip, executing Step 106;

Step 106 specifically is determining, by the security environment chip, the user operation verification result, and if the user operation verification result is success, executing Step 107; if the user operation verification result is failure, reporting an error;

Step 107 specifically is setting, by the security environment chip, the authentication mode confirmation identifier according to the value of the fingerprint authentication identifier, obtaining, by the security environment chip, the client data from the application protocol data unit instruction, generating data to be signed according to the authentication mode confirmation identifier and the client data, performing the signature operation on the data to be signed to generate the signature result, and sending the signature result to the fingerprint management chip;

Step 108 specifically is receiving, by the fingerprint management chip, the signature result and sending the signature result to the upper host.

In Step 103, when the security environment chip determines that the value of the fingerprint authentication identifier in the option parameter is a first preset value, the method further includes: determining, by the security environment chip, the value of a fingerprint entry status identifier in the command header of the application protocol data unit instruction, and if the value of the fingerprint entry status identifier is the third preset value, executing Step 104, and if the value of the fingerprint entry status identifier is the fourth preset value, reporting an error.

Step 101 specifically is that the command of the upper host received by the fingerprint management chip is a credential-generating command.

Step 101 specifically is that the command of the upper host received by the fingerprint management chip is an assertion-obtaining command.

After in Step 103, the determining, by the security environment chip, the value of the fingerprint authentication identifier in the option parameter is the second preset value, the method further includes: determining, by the security environment chip, the value of the key authentication identifier in the option parameter, and if the value of the key authentication identifier is the first preset value, executing Step 105, and if the value of the key authentication identifier is the second preset value, executing Step 107;

When the security environment chip determines in Step 103 that the value of the fingerprint authentication identifier in the option parameter is the second preset value and the security environment chip determines that the value of the key authentication identifier in the option parameter is the second preset value, Step 107 specifically is setting, by the security environment chip, the authentication mode confirmation identifier according to the value of the fingerprint authentication identifier and the value of the key authentication identifier, obtaining, by the security environment chip, the client data from the assertion-obtaining command, generating the data to be signed according to the authentication mode confirmation identifier and the client data, performing the signature operation on the data to be signed to generate a signature result.

Step 103 specifically is determining, by the security environment chip, the value of the fingerprint authentication identifier in the option parameter, and if the value of the fingerprint authentication identifier is the first preset value, generating a special status code and sending the special status code to the fingerprint management chip, executing Step 104; if the value of the fingerprint authentication identifier is the second preset value, generating a special status code and sending the special status code to the fingerprint management chip, executing Step 105;

Step 104 specifically is receiving, by the fingerprint management chip, a special status code and determining whether the special status code is legitimate, and if yes, generating, by the fingerprint management chip, a random number and prompting the user to input the fingerprint, verifying the fingerprint input by the user to obtain the user operation verification result, encrypting, by the fingerprint management chip, the user operation verification result by using the random number and a first session key to obtain an encrypted user operation verification result and sending the encrypted user operation verification result and the random number to the security environment chip, executing Step 106; if no, reporting an error;

Step 105 specifically is receiving, by that the fingerprint management chip, the special status code and determining whether the special status code is legitimate, and if yes, generating, by the fingerprint management chip, a random number, prompting the user to press a key and verifying the key pressed by the user to obtain a user operation verification result, encrypting, by the fingerprint management chip, the user operation verification result by using the random number and a first session key to obtain an encrypted user operation verification result, sending the encrypted user operation verification result and the random number to the security environment chip, executing Step 106; if no, reporting an error;

Step 106 specifically is decrypting, by the security environment chip, the encrypted user operation verification result by using the random number and s second session key, determining the user operation verification result, and if the user operation verification result is success, executing Step 107, and if the user operation verification result is failure, reporting an error.

Step 103 specifically is determining, by the security environment chip, the value of the fingerprint authentication identifier in the option parameter, and if the value of the fingerprint authentication identifier is the first preset value, generating a random number and a special status code, sending the random number and the special status code to the fingerprint management chip, executing Step 104; if the value of the fingerprint authentication identifier is the second preset value, generating a random number and a special status code, sending the random number and the special status code to the fingerprint management chip, executing Step 105;

Step 104 specifically is receiving, by the fingerprint management chip, the random number and the special status code, and determining whether the special status code is legitimate, and if yes, prompting, by the fingerprint management chip, the user to input a fingerprint, verifying the fingerprint input by the user to obtain the user operation verification result, encrypting, by the fingerprint management chip, the user operation verification result by using the random number and the first session key to obtain an encrypted user operation verification result, and sending the encrypted user operation verification result to the security environment chip, executing Step 106; if no, reporting an error;

Step 105 specifically is receiving, by the fingerprint management chip, the special status code and the random number and determining whether the special status code is legitimate, and if yes, prompting, by the fingerprint management chip, the user to press the key and verifying the key pressed by the user to obtain a user operation verification result, encrypting, by the fingerprint management chip, the user operation verification result by using the random number and the first session key to obtain an encrypted user operation verification result and sending the encrypted user operation verification result to the security environment chip, executing Step 106; if no, reporting an error;

Step 106 specifically is decrypting, by the security environment chip, the received encrypted user operation verification result by using the random number and the second session key, determining the user operation verification result, and if the user operation verification result is success, executing Step 107; if the user operation verification result is failure, reporting an error.

The present disclosure further provides an authentication device, including:
  a first receiving module configured to receive a command of an upper host;
  a parsing module configured to parse an option parameter in the command of the upper host;
  a second determining module configured to determine a value of the fingerprint authentication identifier in the option parameter; further is configured to determine whether a user operation verification result obtained by a prompting and verifying module is success or failure;
  the prompting and verifying module configured to, when the second determining module determines that the value of the fingerprint authentication identifier in the option parameter is the first preset value, prompt the user to input a fingerprint, and verify the fingerprint input by the user to obtain a user operation verification result; and further configured to, when the second determining module determines that the value of the fingerprint authentication identifier in the option parameter is the second preset value, prompt the user to press a key, and verify the key pressed by the user to obtain a user operation verification result;
  a second error reporting module configured to, when the second determining module determines that the user operation verification result is failure, report an error;
  a setting module configured to set the authentication mode confirmation identifier according to the value of the fingerprint authentication identifier;
  an obtaining module configured to obtain client data from the command of the upper host;
  a second generating module configured to generate data to be signed according to the authentication mode confirmation identifier and the client data, perform a signature operation on data to be signed and generate a signature result; and
  a first sending module configured to send the signature result generated by the second generating module to the upper host.

The second determining module is further configured to, when the second determining module determines that value of the fingerprint authentication identifier in the option parameter is the first preset value, determine a value of the fingerprint entry status identifier in a command header of an instruction of the upper host;
  the prompting and verifying module is further configured to, when the second determining module determines that the value of the fingerprint entry status identifier is a third preset value, prompt the user to input a fingerprint and verify the fingerprint input by the user to obtain a user operation verification result;
  the error reporting module is further configured to, when the second determining module determines that the value of the fingerprint entry status identifier in the command header of the instruction of the upper host is a fourth preset value, report an error.

The command of the upper host is a credential-generating command.

The command of the upper host is specifically an assertion-obtaining command, the second determining module is further configured to, when the second determining module determines that the value of the fingerprint authentication identifier in the option parameter is the second preset value, determine the value of the key authentication identifier in the option parameter;
  the prompting and verifying module specifically is configured to, when the second determining module determines that the value of the fingerprint authentication identifier in the option parameter is the second preset value and the value of the key authentication identifier in the option parameter is the first preset value, prompt the user to press a key and verify the key pressed by the user to obtain a user operation verification result;
  the setting module is further configured to, when the second determining module determines that the value of the fingerprint authentication identifier in the option parameter is the second preset value and the value of the key authentication identifier in the option parameter is the second preset value, set the authentication mode confirmation identifier according to the value of the fingerprint authentication identifier and the value of the key authentication identifier;
  a second generating module specifically is configured to generate data to be signed according to the authentication mode confirmation identifier set by the setting module and the client data obtained by the obtaining module, perform a signature operation on the data to be signed and generate a signature result.

The setting module specifically is configured to, when the second determining module determines that the value of the fingerprint authentication identifier in the option parameter is the first preset value, set a bit corresponding to the fingerprint authentication identifier of the authentication mode confirmation identifier; when the second determining module determines that the value of the fingerprint authentication identifier in the option parameter is the second preset value, reset the bit corresponding to the fingerprint authentication identifier in the authentication mode confirmation identifier.

The setting module further is configured to, when the second determining module determines that the value of the fingerprint authentication identifier in the option parameter is the second preset value and the value of the key authentication identifier in the option parameter is the second preset value, reset the bit corresponding to the fingerprint authentication identifier in the authentication mode confirmation identifier; reset the bit corresponding to the key authentication identifier in the authentication mode confirmation identifier.

The authentication device includes a fingerprint management chip and a security environment chip; the fingerprint management chip includes a first receiving module, a encapsulating module, a first sending module and a prompting and verifying module; the security environment chip includes a second receiving module, a parsing module, a second determining module, an obtaining module, a second generating module, a setting module, a second sending module and an error reporting module;
  the first receiving module is configured to receive a command of the upper host; further is configured to receive the signature result sent by the second sending module;
  the encapsulating module is configured to encapsulate the command of the upper host received by the first receiving module into an application protocol data unit instruction;
  the first sending module is configured to send the application protocol data unit instruction to the second receiving module; further is configured to send the user operation verification result obtained by the prompting and verifying module to the second receiving module; further is configured to send the signature result sent by the second sending module and received by the first receiving module to the upper host;
  the second receiving module is configured to receive the application protocol data unit instruction; further is configured to receive the user operation verification result sent by first sending module;
  the parsing module is configured to parse the option parameter in the application protocol data unit instruction;
  the second determining module is configured to determine the value of the fingerprint authentication identifier in the option parameter, and further is configured to determine the user operation verification result;
  the prompting and verifying module is configured to, when the second determining module determines that the value of the fingerprint authentication identifier in the option parameter is the first preset value, prompt the user to input a fingerprint and verify the fingerprint input by the user to obtain a user operation verification result; further is configured to, when the second determining module determines that the value of the fingerprint authentication identifier in the option parameter is the second preset value, prompt the user to press a key and verify the key pressed by the user to obtain a user operation verification result;
  the setting module is configured to, when the second determining module determines that the user operation verification result is success, set the authentication mode confirmation identifier according to the value of the fingerprint authentication identifier;
  the obtaining module is configured to obtain client data from the application protocol data unit instruction;
  the second generating module is configured to generate data to be signed according to the authentication mode confirmation identifier and the client data, perform a signature operation on the data to be signed to generate a signature result;
  the second sending module is configured to send the signature result to the first receiving module;
  the second error reporting module is configured to report an error when the second determining module determines that the user operation verification result is failure.

The second determining module is further configured to, when the second determining module determines that the value of the fingerprint authentication identifier in the option parameter is the first preset value, determine the value of the fingerprint entry status identifier in the command header of the application protocol data unit instruction;
  the prompting and verifying module specifically is configured to, when the second determining module determines that the value of the fingerprint authentication identifier in the option parameter is the first preset value and determines that the value of the fingerprint entry status identifier in the command header of the application protocol data unit instruction is the third preset value, prompt the user to input a fingerprint and verify the fingerprint input by the user to obtain a user operation verification result; the error reporting module is specifically configured to, when the second determining module determines that the value of the fingerprint authentication identifier in the option parameter is the third preset value and determines that the value of the fingerprint entry status identifier in the command header of the application protocol data unit instruction is the second preset value, report an error.

The command of the upper host received by the first receiving module is a credential-generating command.

The command of the upper host received by the first receiving module is an assertion-obtaining command;
  the second determining module is further configured to, when the second determining module determines that the value of the fingerprint authentication identifier in the option parameter is the second preset value, determine the value of the key authentication identifier in the option parameter;
  the setting module is further configured to, when the second determining module determines that the value of the fingerprint authentication identifier in the option parameter is the second preset value and the value of the key authentication identifier in the option parameter is the second preset value, set the authentication mode confirmation identifier according to the value of the fingerprint authentication identifier and the value of the key authentication identifier;
  the obtaining module is specifically configured to obtain client data from the assertion-obtaining command;

the second generating module specifically is configured to, when the second determining module determines that the value of the fingerprint authentication identifier in the option parameter is the second preset value and the value of the key authentication identifier in the option parameter is the second preset value, generate data to be signed according to the authentication mode confirmation identifier set by the setting module and the client data obtained by the obtaining module, perform a signature operation on data to be signed to generate a signature result.

The fingerprint management chip further includes a first determining module, a first generating module, an encrypting module, a first error reporting module, and the security environment chip further includes a decrypting module;

the second generating module further is configured to, when the second determining module determines that the value of the fingerprint authentication identifier in the option parameter is the first preset value, generate a special status code; further is configured to, when the second determining module determines that the value of the fingerprint authentication identifier in the option parameter is the second preset value, generate a special status code;

the first sending module is further configured to send the special status code to the first receiving module;

the first determining module further is configured to determine whether the special status code is legitimate;

the first generating module is configured to, when the first determining module determines that the special status code is legitimate, generate a random number;

the prompting and verifying module is specifically configured to, when the second determining module determines that the value of the fingerprint authentication identifier in the option parameter is the first preset value and the first determining module determines that the special status code is legitimate, prompt the user to input a fingerprint and verify the fingerprint input by the user to obtain a user operation verification result; when the second determining module determines that the value of the fingerprint authenticating identifier in the option parameter is the second preset value and the first determining module determines that the special status code is legitimate, prompt the user to press a key and verify the key pressed by the user to obtain a user operation verification result;

the encrypting module is configured to use the random number and a first session key to encrypt the user operation verification result to obtain an encrypted user operation verification result;

the first sending module is further configured to send the encrypted user operation verification result and the random number to the second receiving module;

the first error reporting module is configured to, when the first determining module determines that the special status code is not legitimate, report an error;

the decrypting module is configured to use the random number received by the second receiving module to decrypt the encrypted user operation verification result received to obtain a user operation verification result.

The fingerprint management chip further includes a first determining module, an encrypting module and an error reporting module; the security environment chip further includes a decrypting module;

the second generating module is further configured to, when the second determining module determines that the value of the fingerprint authentication identifier in the option parameter is the first preset value, generate a random number and a special status code; is further configured to, when the second determining module determines that the value of the fingerprint authentication identifier in the option parameter is the second preset value, generate a random number and a special status code;

the first receiving module is further configured to receive the special status code and the random number;

the first determining module is further configured to determine whether the special status code is legitimate;

the prompting and verifying module is further configured to, when the second determining module determines that the value of the fingerprint authentication identifier in the option parameter is the first preset value and the first determining module determines that the special status code is legitimate, prompt the user to input the fingerprint and verify the fingerprint input by the user to obtain a user operation verification result; further is configured to, when the second determining module determines that the value of the fingerprint authentication identifier in the option parameter is the second preset value and the first determining module determines that the special status code is legitimate, prompt the user to press a key and verify the key pressed by the user to obtain a user operation verification result;

the encrypting module is configured to use the first session key and the random number received by the first receiving module to encrypt the user operation verification result to obtain an encrypted user operation verification result;

the first sending module is further configured to send the encrypted user operation verification result to the second receiving module;

the first error reporting module is further configured to report an error when the first determining module determines that the special status code is not legitimate;

the decrypting module is configured to use the random number generated by the second generating module to decrypt the encrypted user operation verification result received by the second receiving module to obtain a user operation verification result.

The advantage of the present disclosure is that the present disclosure provides an authentication method and an authentication device, so that the authentication device has multiple authentication ways and meanwhile prevents man-in-middle attack effectively.

BRIEF DESCRIPTION OF THE DRAWINGS

In order to explain more clearly the embodiment of the present disclosure or the technical solution in the prior art, the following will briefly introduce the drawings needed in the embodiments or in the description of the prior art. Apparently, the described drawings are merely a part but not all of the embodiments of the present disclosure. For those of ordinary skill in the art, other drawings can be obtained based on these drawings without creative work.

DETAILED DESCRIPTION

The technical solutions of the embodiments of the present disclosure are described clearly and completely in conjunction with the accompanying drawings as follows. Apparently, the described embodiments are merely a part but not all of the embodiments according to the present disclosure. Based on the described embodiments of the present disclosure, other embodiments obtained by those skilled in the art without any creative work belong to the protection scope of the present disclosure.

Embodiment 1

Figure 1:
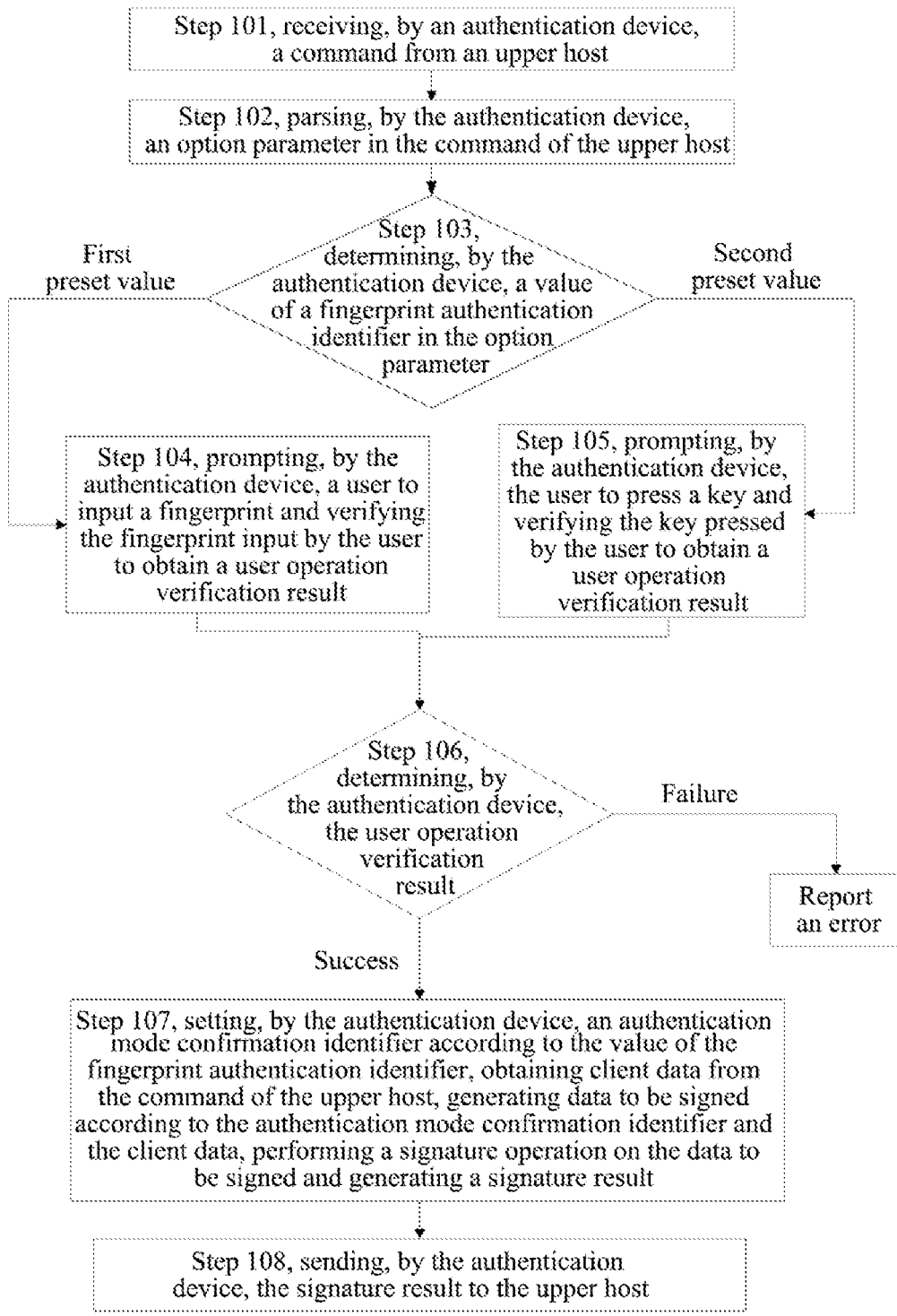
FIG. 1 is a flow chart of an authentication method provided by Embodiment 1 of the present disclosure.

The present embodiment provides an authentication method. As shown in FIG. 1, the authentication method specifically includes the following steps:

Step 101, an authentication device receives a command of an upper host;

Step 102, the authentication device parses an option parameter in the command of the upper host;

Step 103, the authentication device determines a value of the fingerprint authentication identifier in the option parameter, and if the value of the fingerprint authentication identifier is a first preset value, execute Step 104, and if the value of the fingerprint authentication identifier is a second preset value, execute Step 105;

Step 104, the authentication device prompts a user to input a fingerprint and verifies the fingerprint input by the user to obtain a user operation verification result, executes Step 106;

Step 105, the authentication device prompts the user to press a key and verifies the key pressed by the user to obtain a user operation verification result, execute Step 106;

Step 106, the authentication device determines the user operation verification result; if the user operation verification result is success, execute Step 107; if the user operation verification result is failure, report an error;

Step 107, the authentication device sets an authentication mode confirmation identifier according to the value of the fingerprint authentication identifier, obtains client data from the command of the upper host, generates data to be signed according to the authentication mode confirmation identifier and the client data, performing a signature operation on the data to be signed and generates a signature result;

Step 108, the authentication device sends the signature result to the upper host.

In an authentication method provided by the present embodiment, in Step 103, when the authentication device determines that the value of the fingerprint authentication identifier in the option parameter is the first preset value, the method further includes: the authentication device determines a value of a fingerprint entry status identifier in a command header of an instruction of the upper host, and if the value of the fingerprint entry status identifier is a third preset value, execute Step 104, and if the value of the fingerprint entry status identifier is a fourth preset value, report an error.

In an authentication method provided by the present embodiment, the command of the upper host in Step 101 specifically is a credential-generating command.

In an authentication method provided by the present embodiment, the command of the upper host in Step 101 is specifically an assertion-obtaining command, In Step 103, when the authentication device determines that the value of the fingerprint authentication identifier in the option parameter is the second preset value, the method further includes: the authentication device determines a value of a key authentication identifier in the option parameter, and if the value of the key authentication identifier is the first preset value, execute Step 105; if the value of the key authentication identifier is the second preset value, execute Step 107;

In Step 103, when the authentication device determines that the value of the fingerprint authentication identifier in the option parameter is the second preset value and the value of the key authentication identifier in the option parameter is the second preset value, Step 107 is specifically that the authentication device sets an authentication mode confirmation identifier according to the value of the fingerprint authentication identifier and the value of the key authentication identifier, obtains the client data from the command of the upper host, generates data to be signed according to the authentication mode confirmation identifier and the client data, performs the signature operation on the data to be signed and generates the signature result.

In an authentication method provided by the present embodiment, in Step 103 when the authentication device determines that the value of the fingerprint authentication identifier in option parameter is the first preset value, in Step 107 the authentication device setting the authentication mode confirmation identifier according to the value of the fingerprint authentication identifier is specifically: the authentication device sets a bit corresponding to the fingerprint authentication identifier in the authentication mode confirmation identifier;

In Step 103, when the authentication device determines that the value of the fingerprint authentication identifier in the option parameter is the second preset value, in Step 107 the authentication device setting the authentication mode confirmation identifier according to the value of the fingerprint authentication identifier is specifically: the authentication device resets the bit corresponding to the fingerprint authentication identifier in the authentication mode confirmation identifier.

In an authentication method provided by the present embodiment, when the value of the key authentication identifier is the first preset value, in Step 107 the authentication device setting the authentication mode confirmation identifier according to the value of the fingerprint authentication identifier and the value of the key authentication identifier is specifically: the authentication device resets the bit corresponding to the fingerprint authentication identifier in the authentication mode confirmation identifier, and sets the bit corresponding to the key authentication identifier in the authentication mode confirmation identifier;

when the value of the key authentication identifier is the second preset value, in Step 107 the authentication device setting the authentication mode confirmation identifier according to the value of the fingerprint authentication identifier and the value of the key authentication identifier is specifically: the authentication device resets the bit corresponding to the fingerprint authentication identifier in the authentication mode confirmation identifier and resets the bit corresponding to the key authentication identifier in the authentication mode confirmation identifier.

In an authentication method provided by the present embodiment, the authentication device includes a security environment chip and a fingerprint management chip, and in the method, Step 101 is specifically that the fingerprint management chip encapsulates the received command of the upper host into an application protocol data unit instruction and sends the application protocol data unit instruction to the security environment chip;

Step 102 is specifically that the security environment chip receives the application protocol data unit instruction and parses the option parameter in the application protocol data unit instruction;

Step 103 is specifically that the security environment chip determines the value of the fingerprint authentication identifier in the option parameter; if the value of the fingerprint authentication identifier is the first preset value, execute Step 104, and if the value of the fingerprint authentication identifier is the second preset value, execute Step 105;

Step 104 is specifically that the fingerprint management chip prompts a user to input a fingerprint, verifies the fingerprint input by the user to obtain a user operation verification result, and sends the user operation verification result to the security environment chip, execute Step 106;

Step 105 is specifically that the fingerprint management chip prompts the user to press a key, verifies the key pressed by the user to obtain the user operation verification result, and sends the user operation verification result to the security environment chip, execute Step 106;

Step 106 is specifically that the security environment chip determines the user operation verification result; if the user operation verification result is success, execute Step 107, and if the user operation verification result is failure, report an error;

Step 107 is specifically that the security environment chip sets the authentication mode confirmation identifier according to the value of the fingerprint authentication identifier, the security environment chip obtains client data from the application protocol data unit instruction, generates data to be signed according to the authentication mode confirmation identifier and the client data, performs a signature operation on the data to be signed to generate a signature result and sends the signature result to the fingerprint management chip;

Step 108 is specifically that the fingerprint management chip receives the signature result and sends the signature result to the upper host.

In an authentication method provided by the present embodiment, in Step 103, when the security environment chip determines that the value of the fingerprint authentication identifier in the option parameter is the first preset value, the method further includes that the security environment chip determines the value of the fingerprint entry status identifier in the command header of the application protocol data unit instruction; if the value of the fingerprint entry status identifier is a third preset value, execute Step 104, and if the value of the fingerprint entry status identifier is a fourth preset value, report an error.

In an authentication method provided by the present embodiment, Step 101 is specifically that the command received by the fingerprint management chip from the upper host is a credential-generating command.

In an authentication method provided by the present embodiment, Step 101 is specifically that the command received by the fingerprint management chip from the upper host is an assertion-obtaining command;

in Step 103, after the security environment chip determines that the value of the fingerprint authentication identifier in the option parameter is the second preset value, the method further includes: the security environment chip determines the value of the key authenticating identifier in the option parameter; if the value of the key authenticating identifier is the first preset value, execute Step 105, and if the value of the key authenticating identifier is the second preset value, execute Step 107;

when in Step 103 the security environment chip determines that the value of the fingerprint authentication identifier in the option parameter is the second preset value and the security environment chip determines that the value of the key authentication identifier in the option parameter is the second preset value, Step 107 is specifically that the security environment chip sets the authentication mode confirmation identifier according to the value of the fingerprint authentication identifier and the value of the key authentication identifier, the security environment chip obtains the client data from the assertion-obtaining command, generates data to be signed according to the authentication mode confirmation identifier and the client data, performs a signature operation on the data to be signed to generate a signature result.

In an authentication method provided by the present embodiment, Step 103 is specifically that the security environment chip determines the value of the fingerprint authentication identifier in the option parameter; if the value of the fingerprint authentication identifier is the first preset value, generate a special status code and send the special status code to the fingerprint management chip, execute Step 104, and if the value of the fingerprint authentication identifier is the second preset value, generate a special status code and send the special status code to the fingerprint management chip, execute Step 105;

Step 104 is specifically that the fingerprint management chip receives the special status code and determines whether the special status code is legitimate, if yes, the fingerprint management chip generates a random number and prompts the user to input a fingerprint, and verifies the fingerprint input by the user to obtain a user operation verification result, the user operation verification result uses the random number and a first session key to encrypt the user operation verification result to obtain an encrypted user operation verification result, and sends the encrypted user operation verification result and the random number to the security environment chip, execute Step 106; if no, report an error;

Step 105 is specifically that the fingerprint management chip receives the special status code and determines whether the special status code is legitimate, if yes, the fingerprint management chip generates a random number and prompts the user to press a key, verifies the key pressed by the user to obtain a user operation verification result, the fingerprint management chip uses the random number and the first session key to encrypt the user operation verification result to obtain an encrypted user operation verification result, and sends the encrypted user operation verification result and the random number to the security environment chip, execute Step 106; if no, report an error;

Step 106 is specifically that the security environment chip uses the random number and a second session key to decrypt the encrypted user operation verification result received, determines the user operation verification result; if the user operation verification result is success, execute Step 107, and if the user operation verification result is failure, report an error.

In an authentication method provided by the present embodiment, Step 103 is specifically that the security environment chip determines the value of the fingerprint authentication identifier in the option parameter; if the value of the fingerprint authentication identifier is the first preset value, generate a random number and a special status code and send the random number and the special status code to the fingerprint management chip, execute Step 104; if the value of the fingerprint authentication identifier is the second preset value, generate the random number and the special status code and send the random number and the special status code to the fingerprint management chip, execute Step 105;

Step 104 is specifically that the fingerprint management chip receives the random number and the special status code, and determines whether the special status code is legitimate, if yes, the fingerprint management chip prompts the user to input a fingerprint, and verifies the fingerprint input by the user to obtain the user operation verification result, the fingerprint management chip uses the random number and the first session key to encrypt the user operation verification result to obtain an encrypted user operation verification result, and sends the encrypted user operation verification result to the security environment chip, execute Step 106; if no, report an error;

Step 105 is specifically that the fingerprint management chip receives the special status code and the random number, and determines whether the special status code is legitimate, if yes, the fingerprint management chip prompts the user to press a key, verifies the key pressed by the user to obtain a user operation verification result, the fingerprint management chip uses the random number and the first session key to encrypt the user operation verification result to obtain an encrypted user operation verification result, and sends the encrypted user operation verification result to the security environment chip, execute Step 106; if no, report an error;

Step 106 is specifically that the security environment chip uses the random number and the second session key to decrypt the encrypted user operation verification result received, determines the user operation verification result; if the user operation verification result is success, execute Step 107; if the user operation verification result is failure, report an error.

Embodiment 2

Figure 2:
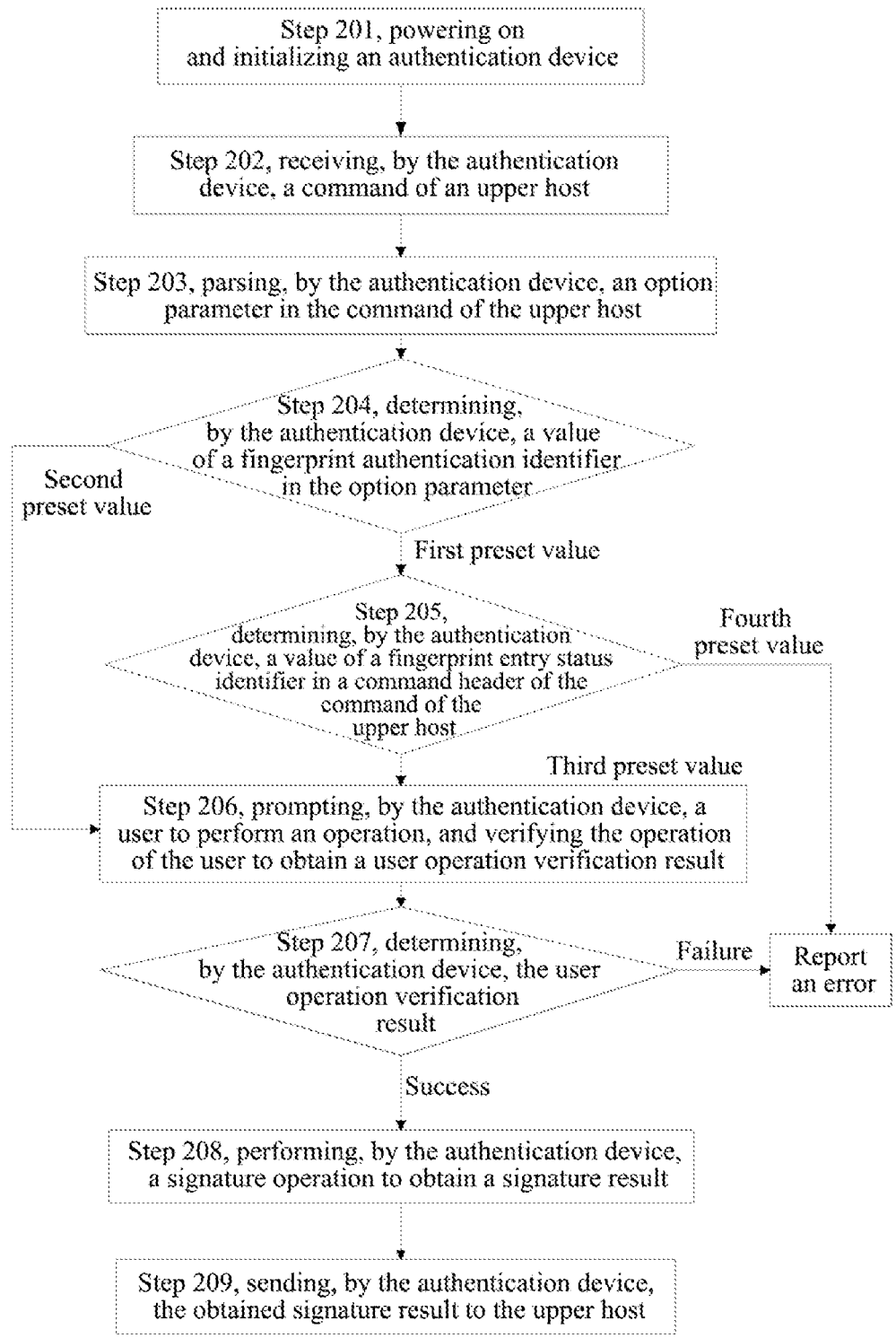
FIG. 2 is a flow chart of an authentication method provided by Embodiment 2 of the present disclosure.

The present embodiment provides an authentication method. As shown by FIG. 2, the method includes the following steps:

Step 201, powering on and initializing an authentication device;

Specifically, the authentication device can be an authentication device of an USB interface or an authentication device of a BLE (Bluetooth low energy) interface.

Step 202, receiving, by the authentication device, a command of an upper host;

Specifically, the command of the upper host is a credential-generating command or an assertion-obtaining command.

Specifically, the credential-generating command includes a command header part, i.e., 8010010000 00AD and a data field part, i.e.,
01A50158206871349682222EC17202E42505F8ED2B
16AE22F16BB05B88C25DB9
E602645F14102A2626964666368656E7169646E
616D65666368656E716903A3626964582001
B65EBF914724C5FC50BE4E9FF2E61787FE97F
8F0B1544344316ECD24925F01646E616D656
E6368656E7169403136332E636F6D6B6469
73706C61794E616D65666368656E71690481A2
63616C672664747970656A7075626C69632D
6B657907A2627576F562726BF5;

where, the first byte of the data field represents type of the command, 01 represents that the command is a credential-generating command.

Specifically, the assertion-obtaining command includes a data header part, i.e., 8010010000 0033 and a data field part, i.e.,
02A301666368656E716902582068713496822E
C17202E42505F8ED2B16AE22F1
6BB05B88C25DB9E602645F14105A262757
6F4627570F5;

the first byte of the data field represents type of the command; 02 represents that the command is an assertion-obtaining command.

Step 203, parsing, by the authentication device, an option parameter in the command of the upper host;

Specifically, the option parameter in the present embodiment is options.

When the command of the upper host is the credential-generating command, the authentication device parses parameter 7 in the credential-generating command.

Specifically, the authentication device obtains a key word 07 from the data field part of the credential-generating command, obtains the first byte A2 after the key word 07, takes high three bits 101 of A2 as a type identifier of the parameter 7, determines that the type of the parameter 7 is MAP type according to the type identifier of the parameter 7, takes low five bits 00001 of A2 as the number of members of the parameter 7, takes high three bits 011 of the second byte 62 after the key word 07 as a type identifier of data to be obtained, obtains, according to low five bits 00010 of the second byte 62 after the key word 07, a length of the data to be obtained, the length being two bytes, determines that the two bytes is 7576, then continues to obtain data of one byte after the data to be obtained.

When the command of the upper host is the assertion-obtaining command, the authentication device parses parameter 5 in the assertion-obtaining command.

Specifically, the authentication device obtains a key word 05 in the assertion-obtaining command, obtains the first byte A1 after the key word 05, takes the high three bits of A1 as a type identifier of parameter 5, determines that the type of the parameter 5 is MAP type according to the type identifier of the parameter 5, takes the low five bits 00001 of A1 as the number of members of the parameter 5, takes the high three bits 011 of the second byte 62 after the key word 05 as the type identifier of the data to be obtained, obtains, according to the low five bits 00010 of the second byte 62 after the key word 05, a length of data to be obtained, the length being two bytes, determines that the two bytes is 7576, then continues to obtain data of one byte after the data to be obtained.

Step 204, determining, by the authentication device, a value of a fingerprint authentication identifier in the option parameter; if the value of the fingerprint authentication identifier is a first preset value, executing Step 205; if the value of the fingerprint authentication identifier is a second preset value, executing Step 206;

specifically, in the present embodiment, the fingerprint authentication identifier is uv, the first preset value is true, the second preset value is false.

Specifically, this step is that the authentication device determines a value of uv in options, if the value of the uv in the parameter options is true, execute Step 205, if the value of the uv in the parameter options is false, execute Step 206;

specifically, this step is that the authentication device in this step determines whether the data of one byte after the data to be obtained is F5 corresponding to true or F4 corresponding to false; i.e., the authentication device determines whether the data of one byte after data after 7576 obtained in Step 203 is F5 or F4; if the data is F5, the value of uv in the parameter options is true, then execute Step 205; if the data is F4, the value of uv in the parameter options is false, then execute Step 206.

In this step, the authentication device determines whether a fingerprint verification is needed according to the value of the fingerprint authentication identifier uv in the option parameter options; if the fingerprint authentication identifier uv is the first preset value true, it means that the fingerprint verification is needed, and if the fingerprint authentication identifier uv is the second preset value false, it means that the fingerprint verification is not needed.

Step 205, determining, by the authentication device, a value of a fingerprint entry status identifier in a command header of the command of the upper host; if the value of the fingerprint entry status identifier is a third preset value, executing Step 206, and if the value of the fingerprint entry status identifier is a fourth preset value, reporting an error.

Specifically, in the embodiment, the fingerprint entry status identifier is p1, the third preset value is 01, and the fourth preset value is 00.

Specifically, this step is that the authentication device determines a value of p1 in the command header of the command of the upper host; if the value of p1 is 01, execute Step 206, and if the value of p1 is 00, report an error;

In this step, the authentication device determines whether the fingerprint has been entered according to the received value of the fingerprint entry status identifier p1 in the command header of the command of the upper host, i.e., the value of the fingerprint entry status identifier p1 represents entry status of the fingerprint. The authentication device determines the value of the fingerprint entry status identifier p1; if p1=00, it means that the fingerprint is not entered and an error is reported; if p1=01, it means that the fingerprint has been entered and Step 206 is executed.

In the present embodiment, there is no any specific limit on the value of p1, and other value can be used to indicate whether the fingerprint has been entered or not.

Specifically, the authentication device determines the value of the third byte in the command header of the command of the upper host. For example, if the command of the upper host is a credential-generating command, the value of the third byte in 8010010000 00AD is determined and if the value is determined as 01, it means that the fingerprint has been entered, Step 206 is executed.

If the command of the upper host is the assertion-obtaining command, the value of the third byte in 8010010000 0033 is determined and if the value is determined as 01, it means that the fingerprint has been entered, Step 206 is executed.

Step 206, prompting, by the authentication device, a user to perform an operation, and verifying the operation of the user to obtain a user operation verification result.

In the present embodiment, when the authentication device in Step 205 determines that the value of the fingerprint authentication identifier uv in the option parameter options is the first preset value true, Step 206 is specifically that the authentication device prompts the user to input a fingerprint and verifies the fingerprint input by the user to obtain the user operation verification result; if the verification of the fingerprint of the user is success, the user operation verification result is success; if the verification of the fingerprint of the user is failure, the user operation verification result is failure.

When the authentication device in Step 205 determines that the value of the fingerprint authentication identifier uv in the option parameter options is false, Step 206 specifically is that the authentication device prompts the user to press a key, and verifies the key pressed by the user to obtain the user operation verification result.

Specifically, if verification of the key pressed by the user is success, the user operation verification result is success, if verification of the key pressed by the user is failure, the user operation verification result is failure.

Specifically, in the present embodiment, when the authentication device in Step 205 determines that the value of the fingerprint authentication identifier uv in the option parameter options is false, the value of a key authentication identifier up in the option parameter options is defaulted to be the first preset value true.

Step 207, determining, by the authentication device, the user operation verification result; if the user operation verification result is success, executing Step 208; if the user operation verification result is failure, reporting an error;

Step 208, performing, by the authentication device, a signature operation to obtain a signature result;

specifically, in this step, the authentication device sets a value of an authentication mode confirmation identifier according to the fingerprint authentication identifier and the key authentication identifier in the option parameter, obtains client data from the command of the upper host, generates data to be signed according to the value of the authentication mode confirmation identifier and the client data, uses a self-generated key to sign the data to be signed to generate a signature result.

Figure 3:
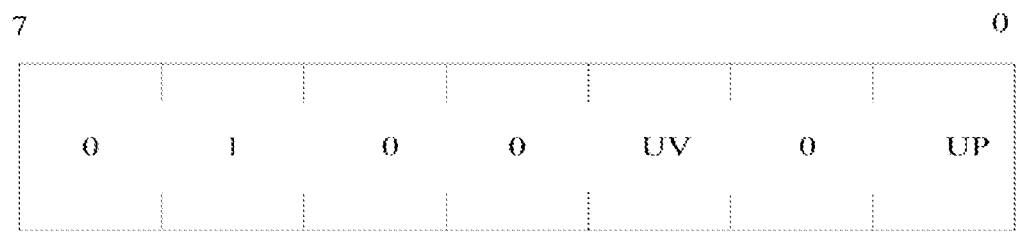
FIG. 3 is a format chart of an authentication mode confirmation identifier provided by Embodiment 2 of the present disclosure.

In the present embodiment, the authentication mode confirmation identifier is flag. The format of the flag, as shown in FIG. 3, includes a bit corresponding to the fingerprint authentication identifier uv and a bit corresponding to the key authentication identifier up.

Specifically, values of bits corresponding to the fingerprint authentication identifier uv and the key authentication identifier up in the authentication mode confirmation identifier flag are set according to values of the fingerprint authentication identifier uv and the key authentication identifier up. For example, if the value of the fingerprint authentication identifier uv is true, the bit corresponding to the fingerprint authentication identifier uv in the authentication mode confirmation identifier flag is set to be 1; if the value of the bit corresponding to the fingerprint authentication identifier uv is false, the bit corresponding to the fingerprint authentication identifier uv in the authentication mode confirmation identifier flag is set to be 0; if the value of the key authentication identifier up is true, the value of the bit corresponding to the key authentication identifier up in the authentication mode confirmation identifier flag is set to be 1; if the value of the bit corresponding to the key authentication identifier up is false, the bit corresponding to the key authentication identifier uv in the authentication mode confirmation identifier flag is set to be 0.

Specifically, the authentication device sets the value of the authentication mode confirmation identifier flag according to the value of the fingerprint authentication identifier uv and the value of the key authentication identifier up in the option parameter options, obtains the client data from the command of the upper host, generates data to be signed according to the value of the flag and the client data, uses a self-generated key to sign the data to be signed to generate a signature result.

Specifically, when the command of the upper host is the credential-generating command, the signature result is:
3045022100B7B13D6506319E17EC4A4E9CD5 D4A614D9C91A85377898B272CD 83A1687BF88A02200F625891FC87E50E0 1A68F2BAE83B422DEE8623176920CBF79267753 D1A56AAC When the command of the upper host is the assertion-obtaining command, the signature result is:
304502201C5EE6D7644FA05449B397FB41 8755CF1652C05041F230FE64292A4E 645C64ED022100C39D530AAD0B30F3 1B6EC59FF44EB720D91EE4D697856E6 DF65066A9 C19C7522.

Step 209, sending, by the authentication device, the obtained signature result to the upper host.

An authentication method of the present embodiment can further include: when the authenticating device, in Step 204, determines that the value of the fingerprint authentication identifier in the option parameter is the second preset value, the authentication device determines the value of the key authentication identifier in option parameter; if the value of the key authentication identifier in the option parameter is the first preset value, execute Step 207; if the value of the key authentication identifier in the option parameter is the second preset value, execute Step 209.

Specifically, in Step 205, if the authentication device determines that the value of the fingerprint authentication identifier uv in the option parameter options is false, the authentication device determines the value of the key authentication identifier up in the option parameter options; if up=true, execute Step 207, if up=false, execute Step 209; correspondingly, Step 207 is specifically that the authentication device prompts the user to press a key and verifies the key pressed by the user to obtain the user operation verification result.

Embodiment 3

Figure 4A:
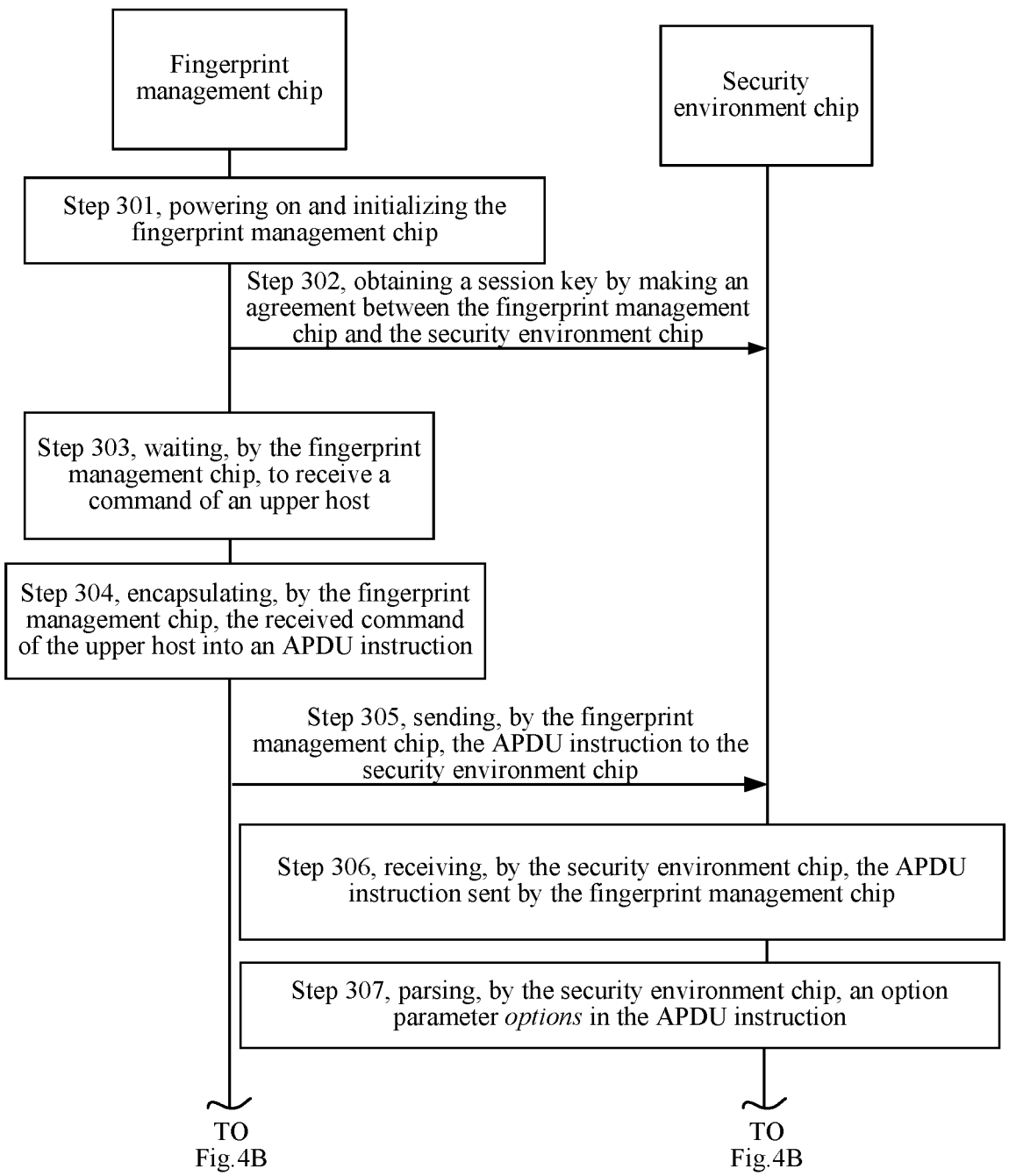
FIGS. 4A, 4B and 4C are a flow chart of an authentication method provided by Embodiment 3 of the present disclosure.
Figure 4B:
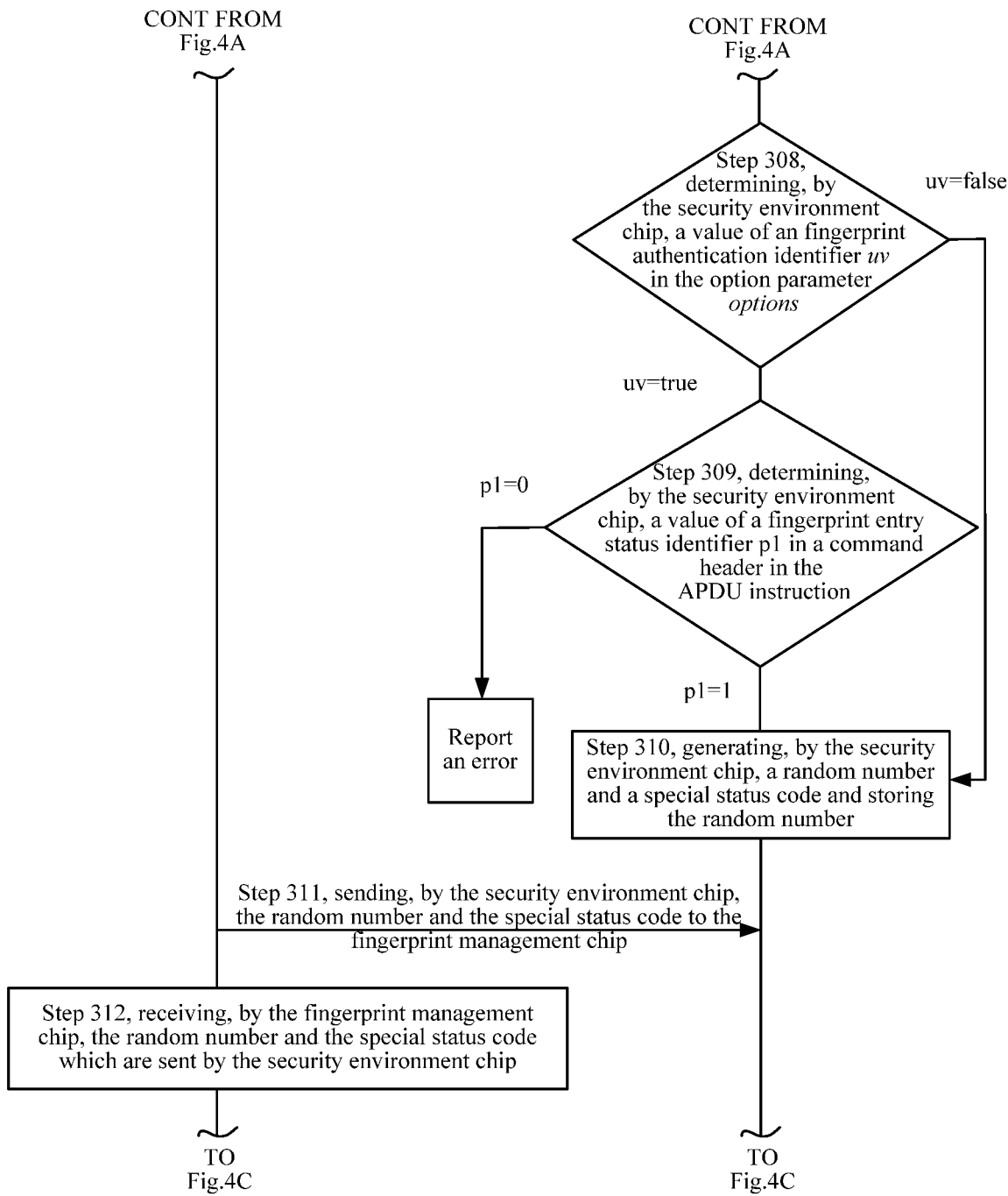
Figure 4C:
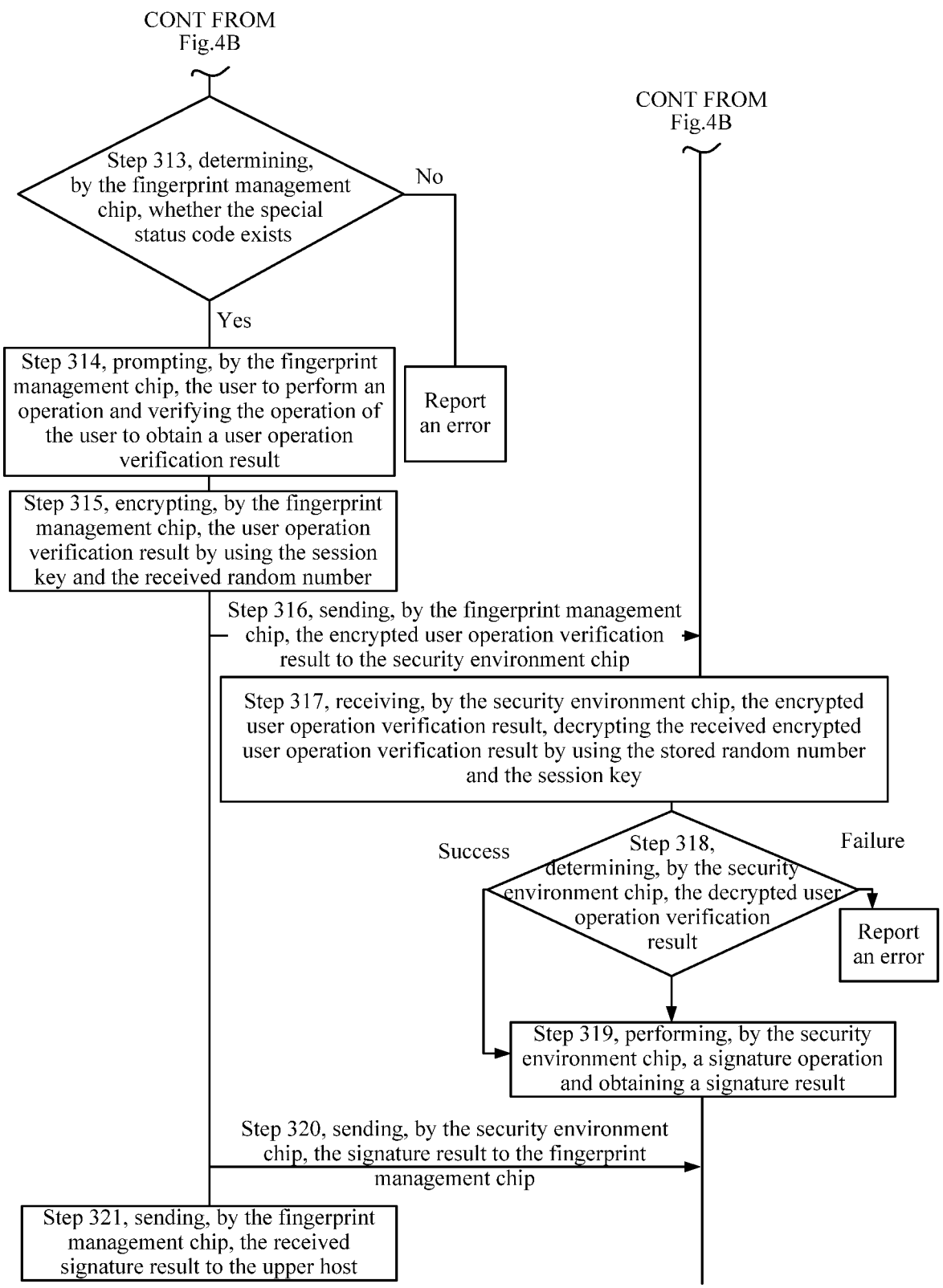

The present embodiment provides an authentication method, as shown by FIGS. 4A, 4B and 4C, specifically including the following steps:

Step 301, powering on and initializing a fingerprint management chip;

specifically, the fingerprint management chip can be a fingerprint management chip of a USB interface or a fingerprint management chip of a BLE (Bluetooth low energy) interface.

Step 302, obtaining a session key by making an agreement between the fingerprint management chip and the security environment chip;

in this step, the session key can be obtained in other ways. For example, the session key can be preset in the fingerprint management chip and the security environment chip, respectively.

In the present embodiment, the fingerprint management chip and the security environment chip can be contained in an authentication device.

Step 303, waiting, by the fingerprint management chip, to receive a command of an upper host;

Step 304, encapsulating the fingerprint management chip, the received command of the upper host into an APDU (application protocol unit) instruction.

Step 305, sending, by the fingerprint management chip, the APDU instruction to the security environment chip;

Step 306, receiving, by the security environment chip, the APDU instruction sent by the fingerprint management chip;

Step 307, parsing, by the security environment chip, an option parameter options in the APDU instruction;

Step 308, determining, by the security environment chip, a value of an fingerprint authentication identifier uv in the option parameter options; if in the option parameter options, the fingerprint authentication identifier uv=true, executing Step 309, and if in the option parameter options, the fingerprint authentication identifier uv=false, executing Step 310;

Specifically, in this step, the security environment chip determines whether a fingerprint verification is needed according to the value of the fingerprint authentication identifier uv in the option parameter options; if the fingerprint authentication identifier uv=true, it means that the fingerprint verification is needed; if the fingerprint authentication identifier uv=false, it means that the fingerprint verification is not needed.

Step 309, determining, by the security environment chip, a value of a fingerprint entry status identifier p1 in a command header in the APDU instruction; if the fingerprint entry status identifier p1=01, executing Step 310; if the fingerprint entry status identifier p1=00, reporting an error;

in the present embodiment, the security environment chip determines whether a fingerprint has been entered according to the value of the fingerprint entry status identifier p1 in the command header in the received APDU instruction, i.e., the value of the fingerprint entry status identifier p1 in the command header in the APDU instruction represents entry status of the fingerprint.

The present step specifically is: the security environment chip determines the value of the fingerprint entry status identifier p1 in the command header; if the fingerprint entry status identifier p1=00, it means that the fingerprint is not entered, an error is reported; if the fingerprint entry status identifier p1=01, it means that the fingerprint has been entered, Step 309 is executed;

in the present embodiment, there is no any special limit on the value of the fingerprint entry status identifier p1. Other value can be used to indicate whether the fingerprint is entered or not.

Step 310, generating, by the security environment chip, a random number and a special status code and storing the random number;

Step 311, sending, by the security environment chip, the random number and the special status code to the fingerprint management chip;

Step 312, receiving, by the fingerprint management chip, the random number and the special status code which are sent by the security environment chip;

Step 313, determining, by the fingerprint management chip, whether the special status code exists; if yes, executing Step 314, and if no, reporting an error.

Step 314, prompting, by the fingerprint management chip, the user to perform an operation and verifying the operation of the user to obtain a user operation verification result.

In the present embodiment, when the security environment chip in Step 307 determines that the value of the fingerprint authentication identifier uv in the option parameter options is true, in Step 314 the operation of the user is user inputting a fingerprint, and the user operation verification result is user fingerprint verification result; if the user fingerprint verification result is success, the user operation verification result is success; if the user fingerprint verification result is failure, the user operation verification result is failure.

When the security environment chip in Step 307 determines that the value of the fingerprint authentication identifier uv in the option parameter options is false, Step 314 is specifically that the fingerprint management chip prompts the user to press a key and verifies the key pressed by the user to obtain a user operation verification result.

Specifically, if the key pressed by the user is verified to be success, the user operation verification result is success, if the key pressed by the user is verified to be failed, the user operation verification result is failure.

Step 315, encrypting, by the fingerprint management chip, the user operation verification result by using the session key and the received random number;

Step 316, sending, by the fingerprint management chip, the encrypted user operation verification result to the security environment chip;

Step 317, receiving, by the security environment chip, the encrypted user operation verification result, decrypting the received encrypted user operation verification result by using the stored random number and the session key;

Step 318, determining, by the security environment chip, the decrypted user operation verification result; if the user operation verification result is success, executing Step 319; if the user operation verification result is failure, reporting an error;

Step 319, performing, by the security environment chip, a signature operation and obtaining a signature result;
specifically, in this step, the security environment chip sets a value of an authentication mode confirmation identifier according to the fingerprint authentication identifier and the key authentication identifier in the option parameter, obtains client data from the APDU instruction, generates data to be signed according to the value of the authentication mode confirmation identifier and the client data, uses a self-generated key to sign the data to be signed to obtain a signature result.

In the present embodiment, the authentication mode confirmation identifier is flag. A format of the flag is as shown in FIG. 3, including bits corresponding to the fingerprint authentication identifier uv and the key authentication identifier up.

Specifically, values of bits corresponding to the fingerprint authentication identifier uv and the key authentication identifier up in the authentication mode confirmation identifier flag are set according to the value of the fingerprint authentication identifier uv and the value of the key authentication identifier up. For example, if the value of the fingerprint authentication identifier uv is true, the bit corresponding to the fingerprint authentication identifier uv in the authentication mode confirmation identifier flag is set to be 1, and if the value of the bit corresponding to the fingerprint authentication identifier uv is false, the bit corresponding to the fingerprint authentication identifier uv in the authentication mode confirmation identifier flag is set to be 0; if the value of the key authentication identifier up is true, the bit corresponding to the key authentication identifier up in the authentication mode confirmation identifier flag is set to be 1; if the value of the bit corresponding to the key authentication identifier up is false, the bit corresponding to the key authentication identifier up in the authentication mode confirmation identifier flag is set to be 0.

Specifically, the security environment chip sets the value of the authentication mode confirmation identifier flag according to the values of the fingerprint authentication identifier uv and the key authentication identifier up in the option parameter options, generates data to be signed according to the value of the flag, uses the self-generated key to sign the data to be signed to generate a signature result.

Step 320, sending, by the security environment chip, the signature result to the fingerprint management chip;

Step 321, sending, by the fingerprint management chip, the received signature result to the upper host.

Figure 5:
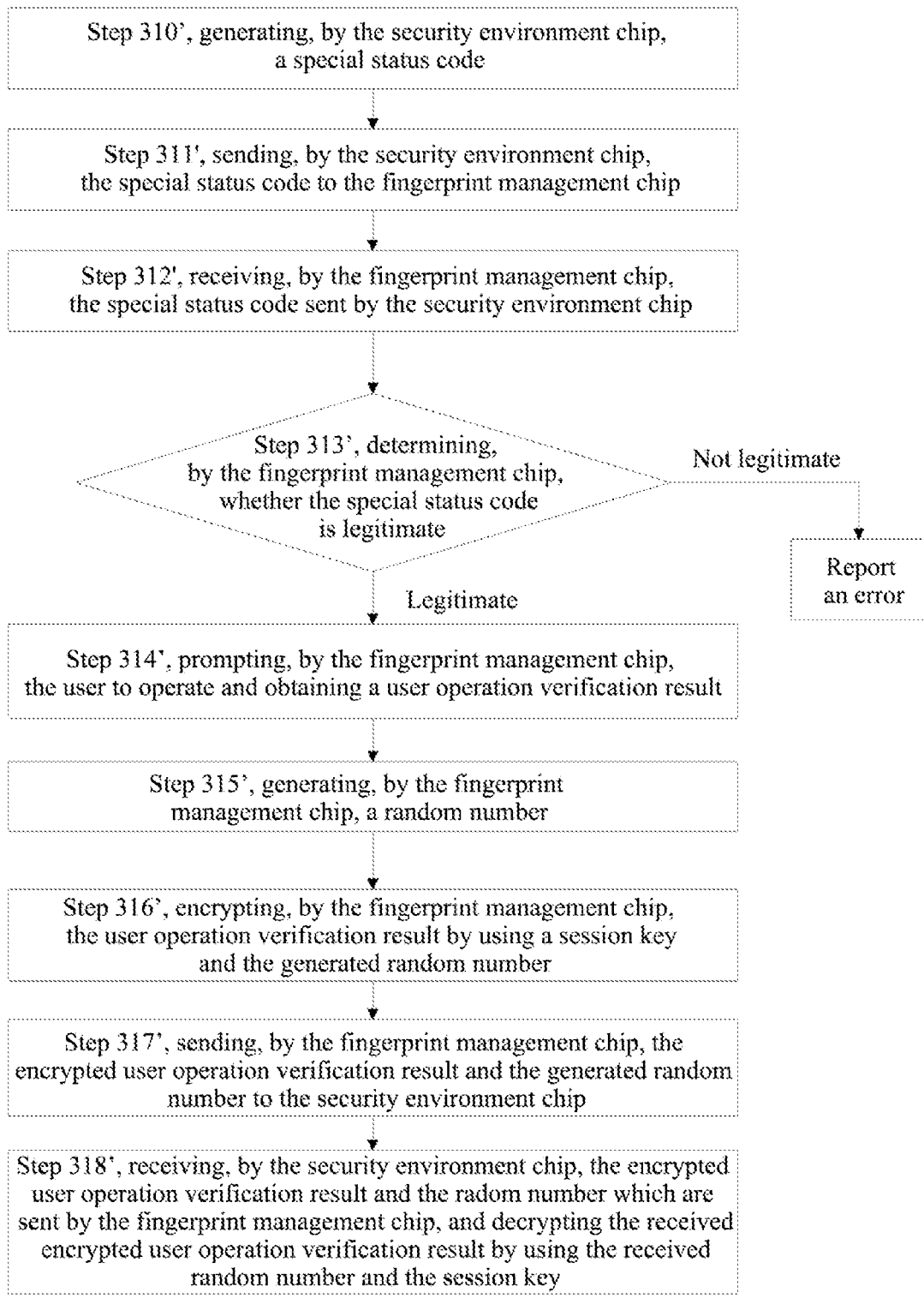
FIG. 5 is a flow chart of another mode of generating and verifying a special status code and a random number in an authentication method provided by Embodiment 3 of the present disclosure.

As shown in FIG. 5, in the present embodiment, Steps 310-317 can be replaced by the following steps:

Step 310', generating, by the security environment chip, a special status code;

Step 311', sending, by the security environment chip, the special status code to the fingerprint management chip;

Step 312', receiving, by the fingerprint management chip, the special status code sent by the security environment chip;

Step 313', determining, by the fingerprint management chip, whether the special status code is legitimate; if yes, executing Step 314; if no, reporting an error.

Step 314', prompting, by the fingerprint management chip, the user to operate and obtaining a user operation verification result;

Step 315', generating, by the fingerprint management chip, a random number;

Step 316', encrypting, by the fingerprint management chip, the user operation verification result by using a session key and the generated random number;

Step 317', sending, by the fingerprint management chip, the encrypted user operation verification result and the generated random number to the security environment chip;

Step 318', receiving, by the security environment chip, the encrypted user operation verification result and the random number which are sent by the fingerprint management chip, decrypting the received encrypted user operation verification result by using the received random number and the session key.

In the present embodiment, after the security environment chip in Step 308 determines that the value of the fingerprint authentication identifier uv in the parameter options is false, the method may further include: the security environment chip determines the value of the key authentication identifier up in the parameter options; if the key authentication identifier up=true, execute Step 310; if the key authentication identifier up=false, execute Step 319; correspondingly, in Step 314, the operation of the user is that the user inputs a fingerprint, and the user operation verification result is a result of fingerprint verification of the user.

Embodiment 4

Figure 6A:
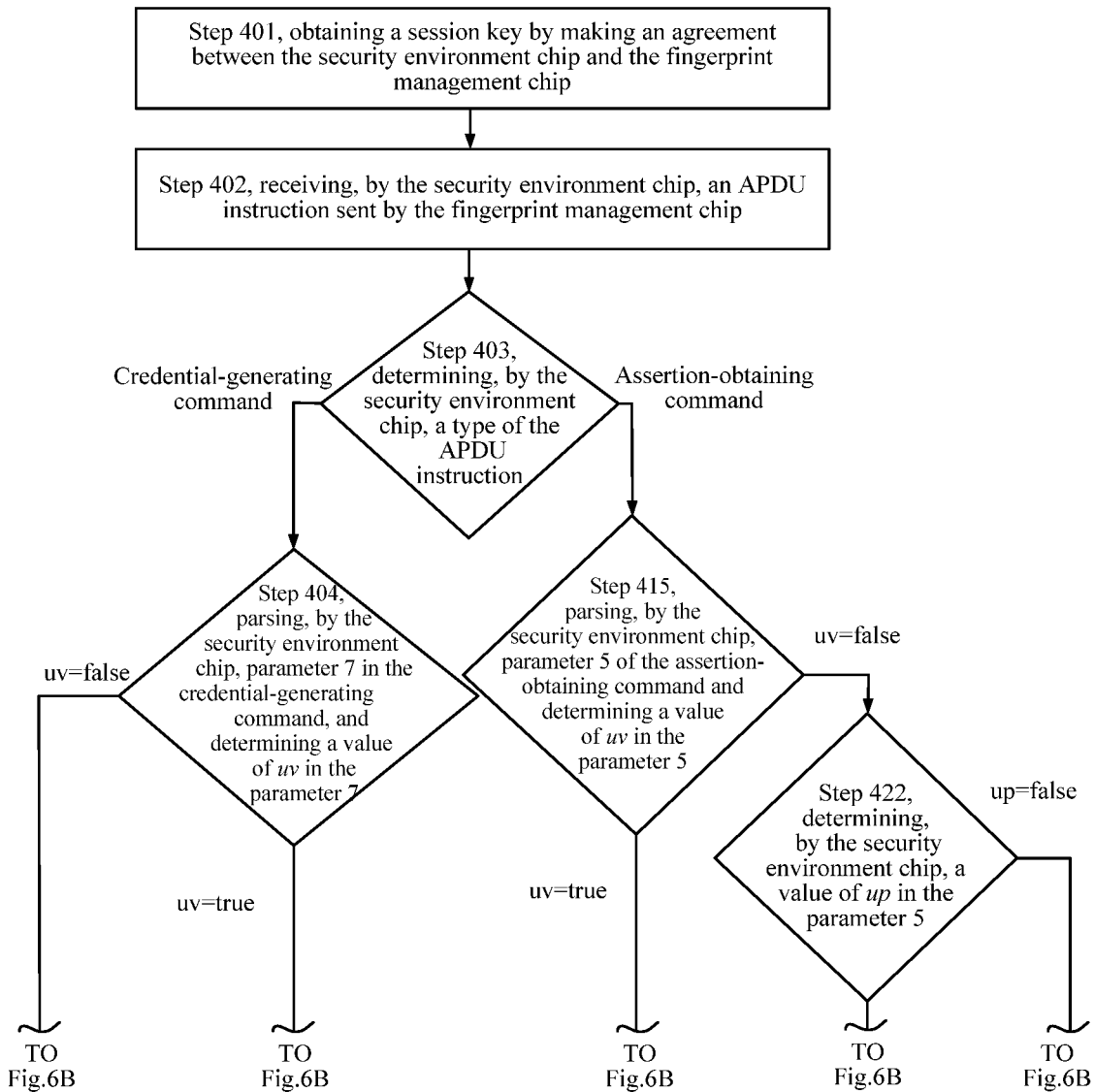
FIGS. 6A, 6B and 6C are a flow chart of an authentication method provided by Embodiment 4 of the present disclosure.
Figure 6B:
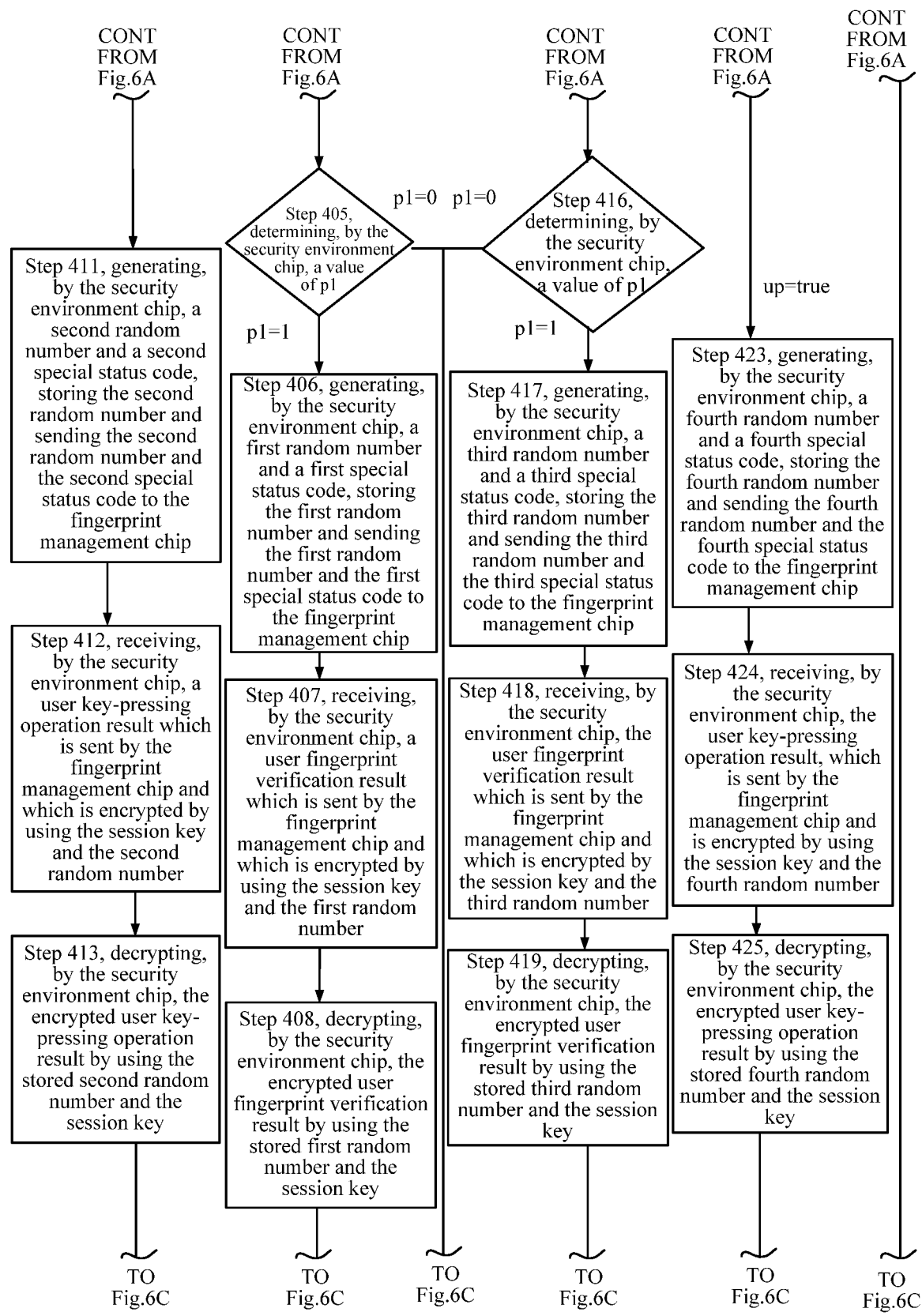
Figure 6C:
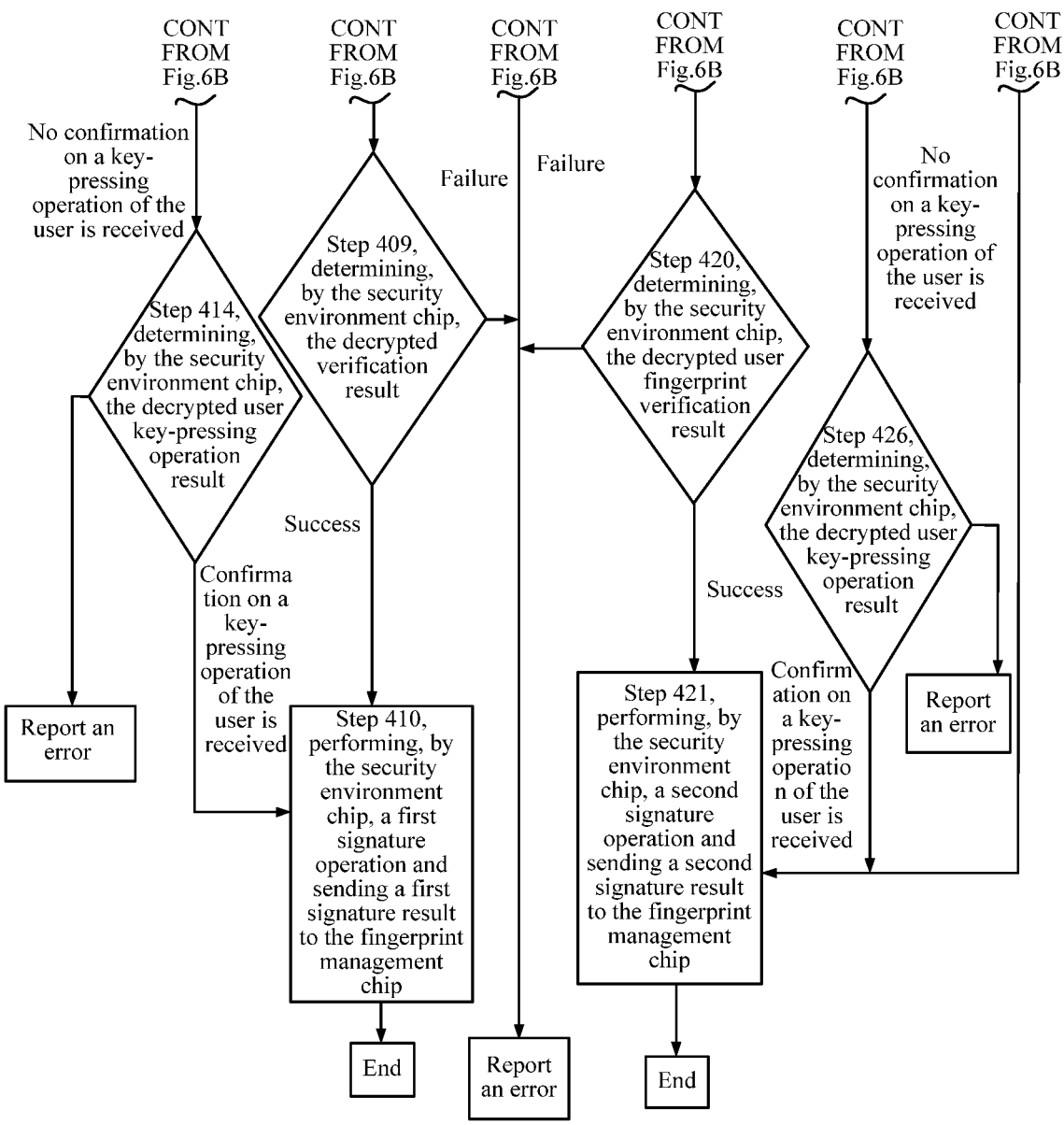

The present embodiment provides an authentication method. As shown in FIGS. 6A, 6B and 6C, the method includes the following steps:

Step 401, obtaining a session key by making an agreement between the security environment chip and the fingerprint management chip;
specifically, the session key by the agreement is: EFC566E1D1D14B13AC5ED3F713EC9632.

In the present embodiment, the security environment chip and the fingerprint management chip can be included in the authentication device.

Step 402, receiving, by the security environment chip, an APDU instruction sent by the fingerprint management chip;

Step 403, determining, by the security environment chip, a type of the APDU instruction; when the APDU instruction is a credential-generating command, executing Step 404; when the APDU instruction is an assertion-obtaining command, executing Step 415;

specifically, the fingerprint management chip can be a fingerprint management chip of a USB interface or a fingerprint management chip of a BLE interface.

In the present embodiment, the security environment chip determines a type of the APDU instruction according to the first byte of a data field part of the received APDU instruction; when the first byte of the data field part is 01, the APDU instruction is a credential-generating command, execute Step 404; when the first byte of the data field part is 02, the APDU instruction is an assertion-obtaining command, execute Step 415;

Step 404, parsing, by the security environment chip, parameter 7 in the credential-generating command, and determining a value of uv in the parameter 7; if vu=true, executing Step 405;

if uv=false, executing Step 411;

specifically, the security environment chip obtains a key word 07 of the data field part of the credential-generating command, and takes the key word 07 as a key word of the parameter 7, obtains the first byte after the key word 07, takes high three bits of the byte as a type identifier of the parameter 7, determines whether the type of the parameter 7 is MAP type according to the type identifier of the parameter 7; if no, report an error to the upper host and go back to Step 403; if yes, take low five bits of the byte as the number of members of the parameter 7, and take high three bits of the second byte after the key word 07 as a type identifier of data to be obtained, obtain a length of the data to be obtained according to low five bits of the second byte after the key word 07, obtain the data to be obtained from data after the second byte after the key word 07 according to the length of the data to be obtained, determine whether the obtained data to be obtained is 7576 corresponding to the uv; if no, report an error to the upper host; if yes, continue to obtain data of one byte after the data to be obtained, determine whether the data of one byte after the data to be obtained is F5 corresponding to true or F4 corresponding to false; if it is F5, execute Step 405; if it is F4, execute Step 410.

For example, the security environment chip receives the credential-generating command sent by the fingerprint management chip, and the credential-generating command includes a command header part 8010010000 00AD and a data field part
01A5015820687134968222EC17202E42505F8 ED2B16AE22F16BB05B88C25DB9 E602645F14102A2626964666368656E71696 46E616D65666368656E716903A3626964582001 B65EBF914724C5FC50BE4E9FF2E61787FE 97F8F0B1544344316ECD24925F01646E616D65 6E6368656E7169403136332E636F6D6B6 46973706C61794E616D65666368656E71690481A2 63616C672664747970656A7075626C69632 D6B657907A2627576F562726BF5; the security environment chip obtains a key word 07 from the data field part of the credential-generating command, obtains the first byte A2 after the key word 07, takes high three bits 101 of A2 as a type identifier of the parameter 7, determines according to the type identifier of the parameter 7 that the type of the parameter 7 is MAP type, takes low five bits 00001 of A2 as the number of members of the parameter 7, takes high three bits 011 of the second byte 62 after the key word 07 as a type identifier of data to be obtained, obtains, according to low five bits 00010 of the second byte 62 after the key word 07, a length of the data to be obtained, the length being two bytes, determines that the two bytes is 7576, then continues to obtain data F5 of one byte after the data to be obtained, then Step 405 is executed.

Step 405, determining, by the security environment chip, a value of p1, if p1=1, execute Step 406, if p1=0, report an error;

specifically, the security environment chip determines a value of the third byte of the command header part; if the value of the third byte is 01, execute Step 406; if the value of the third byte is 00, report an error.

In the present embodiment, the security environment chip determines that the value of the third byte in the command header part 8010010000 00A9 of the received credential-generating command is 01, execute Step 406.

Step 406, generating, by the security environment chip, a first random number and a first special status code, storing the first random number and sending the first random number and the first special status code to the fingerprint management chip;

specifically, the first random number generated by the security environment chip is B57CD1951B370DAD7794044101E25102 and the first special status code is F2.

Step 407, receiving, by the security environment chip, a user fingerprint verification result which is sent by the fingerprint management chip and which is encrypted by using the session key and the first random number;

Step 408, decrypting, by the security environment chip, the encrypted user fingerprint verification result by using the stored first random number and the session key;

Step 409, determining, by the security environment chip, the decrypted verification result; if the verification result is success, executing Step 411, and if the verification result is failure, reporting an error;

Step 410, performing, by the security environment chip, a first signature operation and sending a first signature result to the fingerprint management chip; end.

The first signature operation in this step refers to Step 319 of Embodiment 3, no more detail is given here.

Step 411, generating, by the security environment chip, a second random number and a second special status code, storing the second random number and sending the second random number and the second special status code to the fingerprint management chip;

Step 412, receiving, by the security environment chip, a user key-pressing operation result which is sent by the fingerprint management chip and which is encrypted by using the session key and the second random number;

Step 413, decrypting, by the security environment chip, the encrypted user key-pressing operation result by using the stored second random number and the session key;

Step 414, determining, by the security environment chip, the decrypted user key-pressing operation result; if a key-pressing operation of the user is received, executing Step 410; if no confirmation on a key-pressing operation of the user is received, reporting an error;

Step 415, parsing, by the security environment chip, parameter 5 of the assertion-obtaining command and determining a value of uv in the parameter 5; if uv=true, executing Step 416;

if uv=false, executing Step 422;

specifically, the security environment chip obtains a key word 05 in the assertion-obtaining command, takes it as a key word of the parameter 5, obtains the first byte after the key word 05, takes high three bits of the first byte as a type identifier of the parameter 5, determines whether the type of the parameter 5 is Map type according to the type identifier of the parameter 5; if no, report an error to the upper host and go back to Step 403; if yes, takes low five bits of the first byte as the number of members of the parameter 5, and takes high three bits of the second byte after the key word 05 as a type identifier of data to be obtained, obtains a length of the data to be obtained according to low five bits of the second byte after the key word 05, obtains the data to be obtained from data after the second byte after the key word 05 according to the length of the data to be obtained, determines whether the data to be obtained is 7576 corresponding to uv; if no, report an error to the upper host and go back to Step 403; if yes, continue to obtain data of one byte after the data to be obtained, determine whether the data of one byte after the data to be obtained is F5 corresponding to true or F4 corresponding to false; if the data of one byte after the data to be obtained is F5, execute Step 416; if the data of one byte after the data to be obtained is F4, execute Step 422.

For example, the security environment chip obtains a key word 05 from the assertion-obtaining command 8010010000 0033 02A301666368656E716902582068713496822 2EC17202E42505F8ED2B16AE22F16BB05B88 C25DB9E602645F14105A1627576F5, obtains the first byte A1 after the key word 05, takes high three bits of A1, i.e., 101, as a type identifier of the parameter 5, determines that the type of the parameter 5 is MAP type according to the type identifier of the parameter 5, takes low five bits of A1, i.e., 00001, as the number of members of the parameter 5, takes high three bits 011 of the second byte 62 after the key word 05 as a type identifier of the data to be obtained, obtains, according to low five bits 00010 of the second byte 62 after the key word 05, a length of the data to be obtained, the length being two bytes, determines that the two bytes is 7576, then continues to obtain data F5 of one byte after the data to be obtained, then Step 416 is executed.

Step 416, determining, by the security environment chip, a value of p1, if p1=1, execute Step 417, if p1=0, report an error;

specifically, the security environment chip determines a value of the third byte after the command header; if the value of the first byte is 01, execute Step 414, and if the value of the third byte is 00, report an error.

Step 417, generating, by the security environment chip, a third random number and a third special status code, storing the third random number and sending the third random number and the third special status code to the fingerprint management chip;

specifically, the third random number is D7FE60FA62BD176C5986382C0E6A6E47, and the third special status code is F2.

Step 418, receiving, by the security environment chip, the user fingerprint verification result which is sent by the fingerprint management chip and which is encrypted by the session key and the third random number;

Step 419, decrypting, by the security environment chip, the encrypted user fingerprint verification result by using the stored third random number and the session key;

Step 420, determining, by the security environment chip, the decrypted user fingerprint verification result; if the decrypted user fingerprint verification result is success, executing Step 421, and if the decrypted user fingerprint verification result is failure, reporting an error;

Step 421, performing, by the security environment chip, a second signature operation and sending a second signature result to the fingerprint management chip; ending.

The second signature operation in this step refers to Step 319 of Embodiment 3, no more detail is given here.

Step 422, determining, by the security environment chip, a value of up in the parameter 5; if up=true, executing Step 423, if up=false, executing Step 421;

Specifically, the security environment chip takes high three bits of the first byte after F4 as a type identifier of data to be obtained, obtains a length of the data to be obtained according to low five bits of the first byte after F4, obtains the data to be obtained from the data after the first byte after F4 according to the length of the data to be obtained, determines whether the obtained data to be obtained is 7570 corresponding to up; if no, report an error to the upper host and go back to Step 403; if yes, continue to obtain data of one byte after the data to be obtained, determines whether the data of one byte after the data to be obtained is F5 corresponding to true or F4 corresponding to false, if the data of one byte after the data to be obtained is F5, execute Step 423; if the data of one byte after the data to be obtained is F4, execute Step 421.

For example, in Step 415, if the security environment chip obtains the assertion-obtaining command 8010010000 0033 02A301666368656E71690258206871349682 22E C17202E42505F8ED2B16AE22F16BB0 5B88C25DB9E602645F14105A2627576F4627570F5, the value of 7576 corresponding to uv, which is obtain by parsing the command, is F4 corresponding to false, then in Step 422, the security environment chip executes the following operations:

the security environment chip takes high tree bits 011 of the first byte 62 after F4 as the type identifier of the data to be obtained, obtains, according to low five bits 00010 of the first byte 62 after F4, a length of the data to be obtained, the length being two bytes, determines that the two bytes is 7570, then continues to obtain data F5 of one byte after the data to be obtained, then Step 423 is executed.

Step 423, generating, by the security environment chip, a fourth random number and a fourth special status code, storing the fourth random number and sending the fourth random number and the fourth special status code to the fingerprint management chip;

Step 424, receiving, by the security environment chip, the user key-pressing operation result, which is sent by the fingerprint management chip and is encrypted by using the session key and the fourth random number;

Step 425, decrypting, by the security environment chip, the encrypted user key-pressing operation result by using the stored fourth random number and the session key;

Step 426, determining, by the security environment chip, the decrypted user key-pressing operation result; if user confirming key-pressing operation is received, executing Step 421, if no confirmation on a key-pressing operation of the user is received, reporting an error.

Embodiment 5

Figure 7:
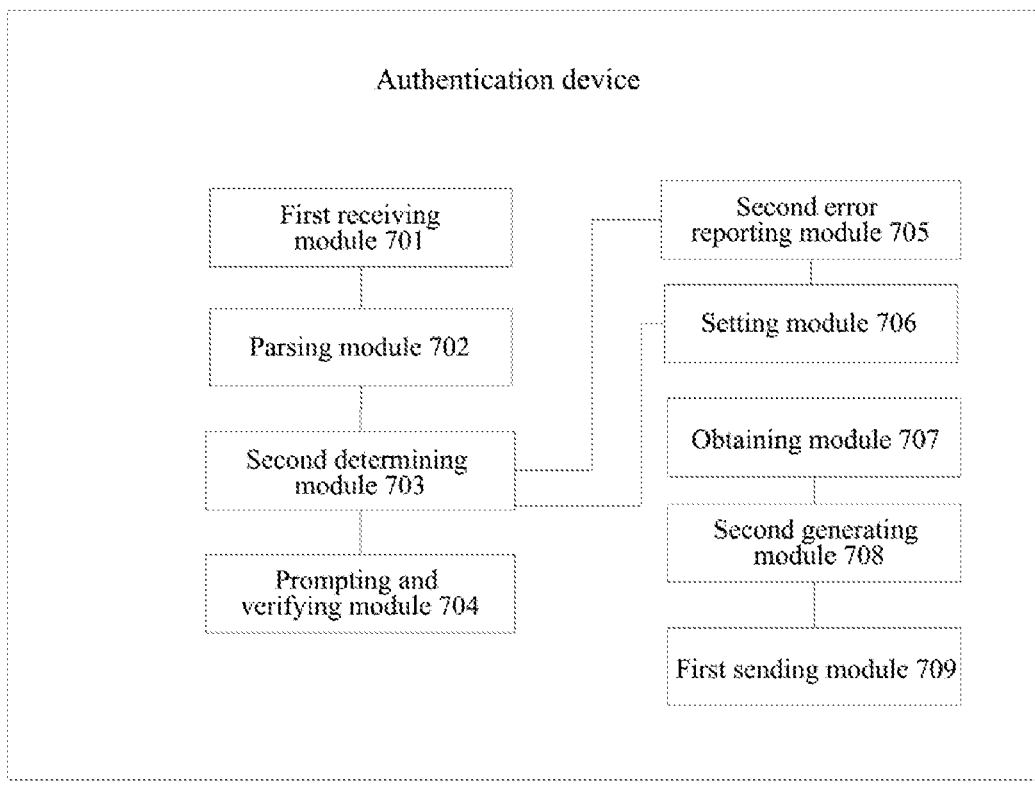
FIG. 7 is a structural diagram of an authentication device provided by Embodiment 5 of the present disclosure.

The present embodiment provides an authentication device. As shown in FIG. 7, the authentication device includes:
- a first receiving module 701 configured to receive a command of an upper host;
- a parsing module 702 configured to parse an option parameter in the command of the upper host;
- a second determining module 703 configured to determine a value of a fingerprint authentication identifier in the option parameter; further configured to determine whether a user operation verification result obtained by a prompting and verifying module 704 is success or failure;
- the prompting and verifying module 704 configured to, when the second determining module 703 determines that the value of the fingerprint authentication identifier in the option parameter is a first preset value, prompt a user to input a fingerprint and verify the fingerprint input by the user to obtain a user operation verification result; further configured to, when the second determining module 703 determines that the value of the fingerprint authentication identifier in the option parameter is a second preset value, prompt the user to press a key and verify the key pressed by the user to obtain the user operation verification result;
- a second error reporting module 705 configured to, when the second determining module 703 determines that the user operation verification result is failure, report an error;
- a setting module 706 configured to set an authentication mode confirmation identifier according to the value of the fingerprint authentication identifier;
- an obtaining module 707 configured to obtain client data from the command of the upper host;
- a second generating module 708 configured to generate data to be signed according to the authentication mode confirmation identifier and the client data, perform a signature operation on the data to be signed and generate a signature result;
- a first sending module 709 configured to send the signature result generated by the second generating module 708 to the upper host.

In the present embodiment, the second determining module 703 is further configured to, when the second determining module 703 determines that the value of the fingerprint authentication identifier in the option parameter is a first preset value, determine a value of a fingerprint entry status identifier in a command header of the command of the upper host;

the prompting and verifying module 704 is further configured to, when the second determining module 703 determines that the value of the fingerprint entry status identifier is a third preset value, prompt the user to input the fingerprint and verify the fingerprint input by the user to obtain the user operation verification result; and the error reporting module is further configured to, when the second determining module 703 determines that the value of the fingerprint entry status identifier in the command header of the command of the upper host is a fourth preset value, report an error.

In the present embodiment, the command of the upper host is a credential-generating command.

In the present embodiment, the command of the upper host specifically may also be an assertion-obtaining command. The second determining module 703 is further configured to, when the second determining module 703 determines that the value of the fingerprint authentication identifier in the option parameter is a second preset value, determine the value of the key authentication identifier in the option parameter;

the prompting and verifying module 704 is specifically configured to, when the second determining module 703 determines that the value of the fingerprint authentication identifier in the option parameter is the second preset value and the value of the key authentication identifier in the option parameter is the first preset value, prompt the user to press a key and verify the key pressed by the user to obtain the user operation verification result;

the setting module 706 further is configured to, when the second determining module 703 determines that a value of the fingerprint authentication identifier in the option parameter is the second preset value and the value of the key authentication identifier in the option parameter is the second preset value, set the authentication mode confirmation identifier according to the value of the fingerprint authentication identifier and the value of the key authentication identifier; and the second generating module 708 is specifically configured to generate data to be signed according to the authentication mode confirmation identifier set by the setting module 706 and the client data obtained by the obtaining module 707, perform a signature operation on the data to be signed and generate a signature result.

In the present embodiment, the setting module 706 is specifically configured to, when the second determining module 703 determines that the value of the fingerprint authentication identifier in the option parameter is the first preset value, set a bit corresponding to the fingerprint authentication identifier in the authentication mode confirmation identifier; when the second determining module 703 determines that the value of the fingerprint authentication identifier in the option parameter is the second preset value, reset the bit corresponding to the fingerprint authentication identifier in the authentication mode confirmation identifier.

In the present embodiment, the setting module 706 is further configured to, when the second determining module 703 determines that the value of the fingerprint authentication identifier in the option parameter is the second preset value and the value of the key authentication identifier in the option parameter is the second preset value, reset the bit corresponding to the fingerprint authentication identifier in the authentication mode confirmation identifier, and reset a bit corresponding to the key authentication identifier in the authentication mode confirmation identifier.

In the present embodiment, the authentication device includes a fingerprint management chip and a security environment chip, the fingerprint management chip includes: a first receiving module 701, a encapsulating module, a first sending module 709, a prompting and verifying module 704; the security environment chip includes: a second receiving module, a parsing module 702, a second determining module 703, an obtaining module 707, a second generating module 708, a setting module 706, a second sending module and an error reporting module;

the first receiving module 701 is configured to receive a command of an upper host; and further configured to receive a signature result sent by the second sending module;

the encapsulating module is configured to encapsulate the command of the upper host received by the first receiving module 701 into an application protocol data unit instruction;

the first sending module 709 is configured to send the application protocol data unit instruction to the second receiving module; further configured to send a user operation verification result obtained by the prompting and verifying module 704 to the second receiving module; and further configured to send the signature result, which is received by the first receiving module 701 and sent by the second sending module, to the upper host;

the second receiving module is configured to receive the application protocol data unit instruction; and further configured to receive the user operation verification result sent by the first sending module 709;

the parsing module 702 is configured to parse an option parameter in the application protocol data unit instruction;

the second determining module 703 is configured to determine a value of the fingerprint authentication identifier in the option parameter and further configured to determine the user operation verification result;

the prompting and verifying module 704 is configured to, when the second determining module 703 determines that the value of the fingerprint authentication identifier in the option parameter is a first preset value, prompt the user to input a fingerprint and verify the fingerprint input by the user to obtain the user operation verification result; further configured to, when the second determining module 703 determines that the value of the fingerprint authentication identifier in the option parameter is a second preset value, prompt the user to press a key and verify the key pressed by the user to obtain the user operation verification result;

the setting module 706 is configured to, when the second determining module 703 determines that the user operation verification result is success, set an authentication mode confirmation identifier according to the value of the fingerprint authentication identifier;

the obtaining module 707 is configured to obtain client data from the application protocol data unit instruction;

the second generating module 708 is configured to generate data to be signed according to the authentication mode confirmation identifier and the client data, perform a signature operation on the data to be signed and generate a signature result;

the second sending module is configured to send the signature result to the first receiving module 701;

the second error reporting module 705 is configured to report an error when the second determining module 703 determines that the user operation verification result is failure.

In the present embodiment, the second determining module 703 is further configured to, when the second determining module 703 determines the value of the fingerprint authentication identifier in the option parameter is the first preset value, determine a value of the fingerprint entry status identifier in the command header of the application protocol data unit instruction;

the prompting and verifying module 704 is specifically configured to, when the second determining module 703 determines the value of the fingerprint authentication identifier in the option parameter is the first preset value and the value of the fingerprint entry status identifier in the command header of the application protocol data unit instruction is a third preset value, prompt the user to input a fingerprint and verify the fingerprint input by the user to obtain the user operation verification result; the error reporting module is specifically configured to, when the second determining module 703 determines that the value of the fingerprint authentication identifier in the option parameter is the third preset value and the value of the fingerprint entry status identifier in the command header of the application protocol data unit instruction is the second preset value, report an error.

In the present embodiment, the command of the upper host received by the first receiving module 701 is a credential-generating command.

In the present embodiment, the command of the upper host received by the first receiving module 701 is an assertion-obtaining command;

the second determining module 703 is further configured to, when the second determining module 703 determines that the value of the fingerprint authentication identifier in the option parameter is the second preset value, determine the value of the key authentication identifier in the option parameter;

the setting module 706 is further configured to, when the second determining module 703 determines that the value of the fingerprint authentication identifier in the option parameter is the second preset value and the value of the key authentication identifier in the option parameter is the second preset value, set the authentication mode confirmation identifier according to the value of the fingerprint authentication identifier and the value of the key authentication identifier;

the obtaining module 707 is specifically configured to obtain client data from the assertion-obtaining command;

the second generating module 708 is specifically configured to, when the second determining module 703 determines that the value of the fingerprint authentication identifier in option parameter is the second preset value and the value of the key authentication identifier in the option parameter is the second preset value, generate data to be signed according to the authentication mode confirmation identifier set by the setting module 706 and the client data obtained by the obtaining module 707, perform a signature operation on the data to be signed and generate a signature result.

In the present embodiment, the fingerprint management chip further includes a first determining module, a first generating module, an encrypting module, and a first error reporting module, and the security environment chip further includes a decrypting module;

the second generating module 708 is further configured to, when the second determining module 703 determines the value of the fingerprint authentication identifier in the option parameter is the first preset value, generate a special status code; further is configured to, when the second determining module 703 determines that the value of the fingerprint authentication identifier in the option parameter is the second preset value, generate a special status code;

the second sending module is further configured to send the special status code to the first receiving module 701;

the first determining module is further configured to determine whether the special status code is legitimate;

the first generating module is configured to, when the first determining module determines that the special status code is legitimate, generate a random number;

the prompting and verifying module 704 is specifically configured to, when the second determining module 703 determines that the value of the fingerprint authentication identifier in the option parameter is a first preset value and the first determining module determines that the special status code is legitimate, prompt the user to input a fingerprint and verify the fingerprint input by the user to obtain the user operation verification result; when the second determining module 703 determines that the value of the fingerprint authentication identifier in the option parameter is the second preset value and the first determining module determines that the special status code is legitimate, prompt the user to press a key and verify the key pressed by the user to obtain the user operation verification result;

the decrypting module is configured to use the random number and the first session key to encrypt the user operation verification result to obtain an encrypted user operation verification result;

the first sending module 709 is further configured to send the encrypted user operation verification result and the random number to the second receiving module;

the first error reporting module is configured to, when the first determining module determines that the special status code is not legitimate, report an error;

the decrypting module is configured to use the random number received by the second receiving module to decrypt the received encrypted user operation verification result to obtain the user operation verification result.

In the present embodiment, the fingerprint management chip further includes a first determining module, an encrypting module, a first error reporting module; and the security environment chip further includes a decrypting module;

the second generating module 708 is further configured to, when the second determining module 703 determines that the value of the fingerprint authentication identifier in the option parameter is the first preset value, generate a random number and a special status code; further configured to, when the second determining module 703 determines that the value of the fingerprint authentication identifier in the option parameter is the second preset value, generate the random number and the special status code;

the second sending module is further configured to send the random number and the special status code to the first receiving module;

the first receiving module 701 is further configured to receive the special status code and the random number;

the first determining module is further configured to determine whether the special status code is legitimate;

the prompting and verifying module 704 is further configured to, when the second determining module 703 determines that the value of the fingerprint authentication identifier in the option parameter is the first preset value and the first determining module determines that the special status code is legitimate, prompt the user to input the fingerprint and verify the fingerprint input by the user to obtain the user operation verification result; further configured to, when the second determining module 703 determines that the value of the fingerprint authentication identifier in the option parameter is the second preset value and the first determining module determines that the special status code is legitimate, prompt the user to press the key and verify the key pressed by the user to obtain the user operation verification result;

the encrypting module is configured to use the first session key and the random number received by the first receiving module 701 to encrypt the user operation verification result to obtain the encrypted user operation verification result;

the first sending module 709 is further configured to send the encrypted user operation verification result to the second receiving module;

the first error reporting module is further configured to, when the first determining module determines that the special status code is not legitimate, report an error; and the decrypting module is configured to use the random number generated by the second generating module 708 to decrypt the encrypted user operation verification result received by the second receiving module to obtain the user operation verification result.

The above are only the preferred specific implementation methods of the present disclosure, but the protection scope of the present disclosure is not limited thereto. Any changes or replacements that can be easily conceived by those skilled in the art within the technical scope disclosed by the present disclosure shall be covered by the protection scope of the present disclosure. Therefore, the protection scope of the present disclosure should be subject to the protection scope of the claims.

What is claimed is:

1. An authentication method, comprising the following steps:

Step 101, receiving, by an authentication device, a command from an upper host;

Step 102, parsing, by the authentication device, an option parameter in the command of the upper host;

Step 103, determining, by the authentication device, a value of a fingerprint authentication identifier in the option parameter, and based on the determining the value of the fingerprint authentication identifier is a first preset value, executing Step 104; based on the determining the value of the fingerprint authentication identifier is a second preset value, executing Step 105;

Step 104, prompting, by the authentication device, a user to input a fingerprint and verifying the fingerprint input by the user to obtain a user operation verification result, executing Step 106;

Step 105, prompting, by the authentication device, the user to press a key and verifying the key pressed by the user to obtain a user operation verification result, executing Step 106;

Step 106, determining, by the authentication device, the user operation verification result, and based on the determining the user operation verification result is success, executing Step 107; based on the determining the user operation verification result is failure, reporting an error;

Step 107, setting, by the authentication device, an authentication mode confirmation identifier according to the value of the fingerprint authentication identifier, obtaining client data from the command of the upper host, generating data to be signed according to the authentication mode confirmation identifier and the client data, performing a signature operation on the data to be signed and generating a signature result; and Step 108, sending, by the authentication device, the signature result to the upper host.

2. The method of claim 1, wherein when in Step 103 the authentication device determines that the value of the fingerprint authentication identifier in the option parameter is the first preset value, the method further comprises: determining, by the authentication device, a value of a fingerprint entry status identifier in a command header of the command of the upper host, and based on the determining the value of the fingerprint entry status identifier is the third preset value, executing Step 104, based on the determining the value of the fingerprint entry status identifier is a fourth preset value, reporting an error.

3. The method of claim 1, wherein the command of the upper host in step 101 is specifically a credential-generating command.

4. The method of claim 1, wherein the command of the upper host in step 101 is specifically an assertion-obtaining command, when in Step 103 the authentication device determines the value of the fingerprint authentication identifier in the option parameter is the second preset value, the method further comprises: determining, by the authentication device, a value of a key authentication identifier in the option parameter, and based on the determining the value of the key authentication identifier is the first preset value, executing Step 105; based on the determining the value of the key authentication identifier is the second preset value, executing Step 107; and when in Step 103 the authentication device determines the value of the fingerprint authentication identifier in the option parameter is the second preset value and the value of the key authentication identifier in the option parameter is the second preset value, Step 107 is specifically: setting, by the authentication device, the authentication mode confirmation identifier according to the value of the fingerprint authentication identifier and the value of the key authentication identifier, obtaining the client data from the command of the upper host, generating the data to be signed according to the authentication mode confirmation identifier and the client data, performing the signature operation on the data to be signed and generating the signature result.

5. The method of claim 1, wherein when in Step 103 the authentication device determines that the value of the fingerprint authentication identifier in the option parameter is the first preset value, in Step 107 the setting, by the authentication device, the authentication mode confirmation identifier according to the value of the fingerprint authentication identifier is specifically: setting, by the authentication device, a bit corresponding to the fingerprint authentication identifier in the authentication mode confirmation identifier; and when in Step 103 the authentication device determines that the value of the fingerprint authentication identifier in the option parameter is the second preset value, in Step 107 the setting, by the authentication device, the authentication mode confirmation identifier according to the value of the fingerprint authentication identifier is specifically: resetting, by the authentication device, the bit corresponding to the fingerprint authentication identifier in the authentication mode confirmation identifier.

6. The method of claim 1, wherein the authentication device comprises a security environment chip and a fingerprint management chip, and in the method, Step 101 is specifically: encapsulating, by the fingerprint management chip, the command of the upper host received into an application protocol data unit instruction and sending the application protocol data unit instruction to the security environment chip;

Step 102 is specifically: receiving, by the security environment chip, the application protocol data unit instruction and parsing the option parameter in the application protocol data unit instruction;

Step 103 is specifically: determining, by the security environment chip, the value of the fingerprint authentication identifier in the option parameter, and based on the determining the value of the fingerprint authentication identifier is the first preset value, executing Step 104; based on the determining the value of the fingerprint authentication identifier is the second preset value, executing Step 105;

Step 104 is specifically: prompting, by the fingerprint management chip, the user to input the fingerprint, verifying the fingerprint input by the user to obtain the user operation verification result and sending the user operation verification result to the security environment chip, executing Step 106;

Step 105 is specifically: prompting, by the fingerprint management chip, the user to press the key, verifying the key pressed by the user to obtain the user operation verification result and sending the user operation verification result to the security environment chip, executing Step 106;

Step 106 is specifically: determining, by the security environment chip, the user operation verification result, and based on the determining the user operation verification result is success, executing Step 107; based on the determining the user operation verification result is failure, reporting an error;

Step 107 is specifically: setting, by the security environment chip, the authentication mode confirmation identifier according to the value of the fingerprint authentication identifier, and obtaining, by security environment chip, the client data from the application protocol data unit instruction, generating the data to be signed according to the authentication mode confirmation identifier and the client data, performing the signature operation on the data to be signed and generating the signature result, sending the signature result to the fingerprint management chip; and Step 108 is specifically: receiving, by the fingerprint management chip, the signature result and sending the signature result to the upper host.

7. The method of claim 6, wherein Step 101 is specifically that the command of the upper host received by the fingerprint management chip, is a credential-generating command.

8. The method of claim 6, wherein Step 101 is specifically that the command of the upper host received by the fingerprint management chip is an assertion-obtaining command;

after in Step 103 the security environment chip determines the value of the fingerprint authentication identifier in the option parameter is the second preset value, the method further comprises: determining, by the security environment chip, a value of a key authentication identifier in the option parameter, and based on the determining the value of the key authentication identifier is the first preset value, executing Step 105; based on the determining the value of the key authentication identifier is the second preset value, executing Step 107; and when in Step 103 the security environment chip determines that the value of the fingerprint authentication identifier in the option parameter is the second preset value and the security environment chip determines that the value of the key authentication identifier in the option parameter is the second preset value, Step 107 is specifically: setting, by the security environment chip, the authentication mode confirmation identifier according to the value of the fingerprint authentication identifier and the value of the key authentication identifier, obtaining, by the security environment chip, the client data from the assertion-obtaining command, generating the data to be signed according to the authentication mode confirmation identifier and the client data, performing the signature operation on the data to be signed and generating the signature result.

9. The method of claim 6, wherein Step 103 is specifically: determining, by the security environment chip, the value of the fingerprint authentication identifier in the option parameter, and based on the determining the value of the fingerprint authentication identifier is the first preset value, generating a special status code and sending the special status code to the fingerprint management chip and executing Step 104; based on the determining the value of the fingerprint authentication identifier is the second preset value, generating a special status code and sending the special status code to the fingerprint management chip, executing Step 105;

Step 104 is specifically: receiving, by the fingerprint management chip, the special status code and determining whether the special status code is legitimate; based on the determining the special status code is legitimate, the fingerprint management chip generating a random number and prompting the user to input the fingerprint, verifying the fingerprint input by the user to obtain the user operation verification result, using, by the fingerprint management chip, the random number and a first session key to encrypt the user operation verification result to obtain an encrypted user operation verification result and sending the encrypted user operation verification result and the random number to the security environment chip, executing Step 106; based on the determining the special status code is not legitimate, reporting an error;

Step 105 is specifically: receiving, by the fingerprint management chip, the special status code and determining whether the special status code is legitimate; based on the determining the special status code is legitimate, generating, by the fingerprint management chip, the random number, prompting the user to press the key, verifying the key pressed by the user to obtain the user operation verification result, encrypting, by the fingerprint management chip, the user operation verification result by using the random number and the first session key to obtain the encrypted user operation verification result, sending the encrypted user operation verification result and the random number to the security environment chip, executing Step 106; based on the determining the special status code is not legitimate, reporting an error; and Step 106 is specifically: using, by the security environment chip, the random number and a second session key to decrypt the encrypted user operation verification result received, determining the user operation verification result; based on the determining the user operation verification result is success, executing Step 107; based on the determining the user operation verification result is failure, reporting an error.

10. The method of claim 6, wherein Step 103 is specifically: determining, by the security environment chip, the value of the fingerprint authentication identifier in the option parameter; based on the determining the value of the fingerprint authentication identifier is the first preset value, generating a random number and a special status code, sending the random number and the special status code to the fingerprint management chip and executing Step 104; based on the determining the value of the fingerprint authentication identifier is the second preset value, generating a random number and a special status code, sending the random number and the special status code to the fingerprint management chip and executing Step 105;

Step 104 is specifically: receiving, by the fingerprint management chip, the random number and the special status code, determining whether the special status code is legitimate; based on the determining the special status code is legitimate, prompting, by the fingerprint management chip, the user to input the fingerprint, verifying the fingerprint input by the user to obtain the user operation verification result, encrypting, by the fingerprint management chip, the user operation verification result by using the random number and the first session key to obtain an encrypted user operation verification result, sending the encrypted user operation verification result to the security environment chip, executing Step 106; based on the determining the special status code is not legitimate, reporting an error;

Step 105 is specifically: receiving, by the fingerprint management chip, the special status code and the random number, determining whether the special status code is legitimate, based on the determining the special status code is legitimate, prompting, by the fingerprint management chip, the user to press the key, verifying the key pressed by the user to obtain the user operation verification result, encrypting, by the fingerprint management chip, the user operation verification result by using the random number and the first session key to obtain an encrypted user operation verification result and sending the encrypted user operation verification result to the security environment chip, executing Step 106; based on the determining the special status code is not legitimate, reporting an error; and Step 106 is specifically: decrypting, by the security environment chip, the received encrypted user operation verification result by using the random number and a second session key, determining the user operation verification result, based on the determining the user operation verification result is success, executing Step 107, and based on the determining the user operation verification result is failure, reporting an error.

11. An authentication device, comprising:
a processor and a memory having computer instructions stored therein, the processor, when executing the instructions, is configured to:
receive a command of an upper host;
parse an option parameter in the command of the upper host;
determine a value of a fingerprint authentication identifier in the option parameter; and further configured to determine whether a user operation verification result is success or failure;
based on the determining the value of the fingerprint authentication identifier in the option parameter is a first preset value, prompt the user to input a fingerprint and verify the fingerprint input by the user to obtain the user operation verification result; and further configured to, based on the determining the value of the fingerprint authentication identifier in the option parameter is a second preset value, prompt the user to press a key and verify the key pressed by the user to obtain the user operation verification result;
based on the determining the user operation verification result is failure, report an error;
set an authentication mode confirmation identifier according to the value of the fingerprint authentication identifier;
obtain client data from the command of the upper host;
generate data to be signed according to the authentication mode confirmation identifier and the client data, perform a signature operation on the data to be signed and generate a signature result; and
send the signature result generated by the second generating module to the upper host.

12. The authentication device of claim 11, wherein the processor is further configured to, based on the determining the value of the fingerprint authentication identifier in the option parameter is the first preset value, determine a value of a fingerprint entry status identifier in a command header of the command of the upper host;
based on the determining the value of the fingerprint entry status identifier is a third preset value, prompt the user to input the fingerprint and verify the fingerprint input by the user to obtain the user operation verification result; and
based on the determining the value of the fingerprint entry status identifier in the command header of the command of the upper host is a fourth preset value, report an error.

13. The authentication device of claim 11, wherein the command of the upper host is a credential-generating command.

14. The authentication device of claim 11, wherein the command of the upper host is specifically an assertion-obtaining command, the processor is further configured to, based on the determining the value of the fingerprint authentication identifier in the option parameter is the second preset value, determine a value of a key authentication identifier in the option parameter;
based on the determining the value of the fingerprint authentication identifier in the option parameter is the second preset value and the value of the key authentication identifier in the option parameter is the first preset value, prompt the user to press the key and verify the key pressed by the user to obtain the user operation verification result;
based on the determining the value of the fingerprint authentication identifier in the option parameter is the second preset value and the value of the key authentication identifier in the option parameter is the second preset value, set the authentication mode confirmation identifier according to the value of the fingerprint authentication identifier and the value of the key authentication identifier; and
generate the data to be signed according to the authentication mode confirmation identifier and the client data, perform the signature operation on the data to be signed and generate the signature result.

15. The authentication device of claim 11, wherein
the processor is specifically configured to, based on the determining the value of the fingerprint authentication identifier in the option parameter is the first preset value, set a bit corresponding to the fingerprint authentication identifier in the authentication mode confirmation identifier; based on the determining the value of the fingerprint authentication identifier in the option parameter is the second preset value, reset the bit corresponding to the fingerprint authentication identifier in the authentication mode confirmation identifier.

16. The authentication device of claim 11, wherein the authentication device comprises: a fingerprint management chip and a security environment chip;
the fingerprint management chip is configured to receive the command of the upper host; and receive the signature result;
encapsulate the command of the upper host into an application protocol data unit instruction;
send the application protocol data unit instruction to the security environment chip; further configured to send the user operation verification result to the security environment chip; and further configured to send the signature result to the upper host;
the security environment chip is configured to receive the application protocol data unit instruction; and receive the user operation verification result;
parse the option parameter in the application protocol data unit instruction;
determine the value of the fingerprint authentication identifier in the option parameter and further configured to determine the user operation verification result;
based on the determining the value of the fingerprint authentication identifier of the option parameter is the first preset value, prompt the user to input the fingerprint and verify the fingerprint input by the user to obtain the user operation verification result; and based on the determining the value of the fingerprint authentication identifier in the option parameter is the second preset value, prompt the user to press the key and verify the key pressed by the user to obtain the user operation verification result;
based on the determining the user operation verification result is success, set the authentication mode confirmation identifier according to the value of the fingerprint authentication identifier;
obtain the client data from the application protocol data unit instruction;
generate the data to be signed according to the authentication mode confirmation identifier and the client data, perform the signature operation on the data to be signed and generate the signature result;
send the signature result to the fingerprint management chip; and
based on the determining the user operation verification result is failure.

17. The authentication device of claim 16, wherein the command of the upper host is a credential-generating command.

18. The authentication device of claim 16, wherein the command of the upper host is an assertion-obtaining command;
the security environment chip is further configured to, based on the determining the value of the fingerprint authentication identifier in the option parameter is the second preset value, determine a value of a key authentication identifier in the option parameter;
based on the determining the value of the fingerprint authentication identifier in the option parameter is the second preset value and the value of the key authentication identifier in the option parameter is the second preset value, set the authentication mode confirmation identifier according to the value of the fingerprint authentication identifier and the value of the key authentication identifier;

the security environment chip is specifically configured to obtain the client data from the assertion-obtaining command; and based on the determining the value of the fingerprint authentication identifier in the option parameter is the second preset value and the value of the key authentication identifier in the option parameter is the second preset value, generate the data to be signed according to the authentication mode confirmation identifier and the client data, perform the signature operation on the data to be signed and generate the signature result.

19. The authentication device of claim 16, wherein the security environment chip is further configured to, based on the determining the value of the fingerprint authenticating identifier in the option parameter is the first preset value, generate a special status code; further configured to, based on the determining the value of the fingerprint authentication identifier in the option parameter is the second preset value, generate a special status code;

send the special status code to the fingerprint management chip;

the fingerprint management chip is further configured to determine whether the special status code is legitimate;

based on the determining the special status code is legitimate, generate a random number;

based on the determining the value of the fingerprint authentication identifier in the option parameter is the first preset value and the special status code is legitimate, prompt the user to input the fingerprint, verify the fingerprint input by the user to obtain the user operation verification result; based on the determining the value of the fingerprint authentication identifier in the option parameter is the second preset value and the special status code is legitimate, prompt the user to press the key and verify the key pressed by the user to obtain the user operation verification result;

use the random number and a first session key to encrypt the user operation verification result to obtain an encrypted user operation verification result;

send the encrypted user operation verification result and the random number to the security environment chip;

based on the determining the special status code is not legitimate, report an error; and use the random number to decrypt the received encrypted user operation verification result to obtain the user operation verification result.

20. The authentication device of claim 16, wherein the security environment chip is further configured to, based on the determining the value of the fingerprint authentication identifier in the option parameter is the first preset value, generate a random number and a special status code; and further configured to, based on the determining the value of the fingerprint authentication identifier in the option parameter is the second preset value, generate the random number and the special status code;

send the random number and the special status code to the fingerprint management chip;

the fingerprint management chip is further configured to receive the special status code and the random number;

determine whether the special status code is legitimate;

based on the determining the value of the fingerprint authentication identifier in the option parameter is the first preset value and the special status code is legitimate, prompt the user to input the fingerprint and verify the fingerprint input by the user to obtain the user operation verification result; further configured to based on the determining the value of the fingerprint authentication identifier in the option parameter is the second preset value and the special status code is legitimate, prompt the user to press the key and verify the key pressed by the user to obtain the user operation verification result;

use a first session key and the random number to encrypt the user operation verification result to obtain an encrypted user operation verification result;

send the encrypted user operation verification result to the security environment chip;

based on the determining the special status code is not legitimate, report an error; and use the random number to decrypt the encrypted user operation verification result to obtain the user operation verification result.

* * * * *